United States Patent
Huntley et al.

(10) Patent No.: US 12,537,802 B2
(45) Date of Patent: Jan. 27, 2026

(54) ATTESTATION AND ENFORCEMENT OF CRYPTOGRAPHIC REQUIREMENTS ACROSS MULTIPLE HOPS

(71) Applicant: VMware LLC, Palo Alto, CA (US)

(72) Inventors: Sean Huntley, Sydney (AU); Daniel James Beveridge, Valrico, FL (US); David Ott, Chandler, AZ (US)

(73) Assignee: VMware LLC, Palo Alto, CA (US)

( * ) Notice: Subject to any disclaimer, the term of this patent is extended or adjusted under 35 U.S.C. 154(b) by 269 days.

(21) Appl. No.: 18/356,715

(22) Filed: Jul. 21, 2023

(65) Prior Publication Data

US 2025/0030669 A1    Jan. 23, 2025

(51) Int. Cl.
    *H04L 9/40*     (2022.01)
    *H04L 9/32*     (2006.01)

(52) U.S. Cl.
    CPC ........... *H04L 63/0428* (2013.01); *H04L 9/32* (2013.01)

(58) Field of Classification Search
    CPC . H04L 9/3239; H04L 9/32; H04L 9/50; H04L 63/0428
    USPC .......................................................... 713/168
    See application file for complete search history.

(56) References Cited

U.S. PATENT DOCUMENTS

| | | | | |
|---|---|---|---|---|
| 8,713,668 B2* | 4/2014 | Cooper | ............... | H04L 63/0442 726/13 |
| 8,800,024 B2* | 8/2014 | Cooper | ................... | H04L 63/10 726/13 |
| 8,924,722 B2* | 12/2014 | Horn | ..................... | H04L 63/062 713/168 |
| 9,577,995 B1* | 2/2017 | Kuzmenko | ........... | H04L 63/061 |
| 10,356,059 B2* | 7/2019 | Perrine | .................... | H04W 4/80 |
| 2009/0006840 A1* | 1/2009 | Birger | ..................... | H04L 67/52 713/151 |
| 2017/0201382 A1* | 7/2017 | Lindteigen | .......... | H04L 63/0823 |
| 2021/0243209 A1* | 8/2021 | Ramani | .................... | H04L 63/20 |
| 2025/0141923 A1* | 5/2025 | Van Hooser | ............ | H04L 69/08 |

* cited by examiner

*Primary Examiner* — Amare F Tabor
(74) *Attorney, Agent, or Firm* — King Intellectual Asset Management

(57) ABSTRACT

The disclosure provides an approach for multi-endpoint cryptographic orchestration. Embodiments include establishing, by a first endpoint of a plurality of endpoints related to a multi-endpoint secure communication session, a metadata channel with one or more other endpoints of the plurality of endpoints. Embodiments include sending, by the first endpoint, to a second endpoint of the one or more other endpoints, via the metadata channel, an indication of a cryptographic requirement related to the multi-endpoint secure communication session. Embodiments include performing, by the second endpoint, one or more cryptographic operations related to the multi-endpoint secure communication session based on the indication of the cryptographic requirement. Embodiments include attesting, by the second endpoint, via the metadata channel, that the one or more cryptographic operations comply with the cryptographic requirement.

20 Claims, 6 Drawing Sheets

ATTESTATION AND ENFORCEMENT OF CRYPTOGRAPHIC REQUIREMENTS ACROSS MULTIPLE HOPS

BACKGROUND

Cryptography generally involves techniques for protecting data from unauthorized access. For example, data transmitted over a network may be encrypted in order to protect the data from being accessed by unauthorized parties. For example, even if the encrypted data is obtained by an unauthorized party, if the unauthorized party cannot decrypt the encrypted data, then the unauthorized party cannot access the underlying data. There are many types of cryptographic algorithms, and these algorithms vary in many aspects such as key size, ciphertext size, memory requirements, computation requirements, amenability to hardware acceleration, failure handling, entropy requirements, and the like. Key size refers to the number of bits in a key used by a cryptographic algorithm. Having more bits in a key size results in more computation, but a larger space of possible mappings from cleartext to ciphertext, which is a quality makes it harder for an adversary to guess a key having a larger number of bits.

Ciphertext size refers to the number of bits in the output from a cryptographic algorithm, which may be the same as the number of bits of the input or may include a larger number of bits than the input. Memory requirements and computation requirements generally refer to the amount of memory and processing resources required to perform an algorithm. Amenability to hardware acceleration generally refers to whether an algorithm requires or can be improved through the use of a hardware accelerator. For example, a compute accelerator is an additional hardware or software processing component that processes data faster than a central processing unit (CPU) of the computer. Failure handling refers to the processes by which an algorithm accounts for failures, such as recovering keys that are lost or deactivated or, with some algorithms that have probabilistic steps, retrying one or more probabilistic steps that have failed. Entropy requirements generally refer to the amount of randomness required by an algorithm, such as an extent to which randomly generated values are used as part of the algorithm (e.g., which generally improves security of the algorithm).

In many cases, cryptographic operations may relate to communications among a plurality of endpoints or "hops", each of which may perform operations for and/or contribute data to an overarching process. For example, a plurality of endpoints may participate in a secure communication session, such as related to data aggregation.

Data aggregation generally involves receiving multiple items of data, such as from different data sources, and performing one or more computations in order to produce an aggregated result based on the multiple items of data. One example of data aggregation is federated learning, which generally refers to techniques in which an algorithm is trained across multiple decentralized edge devices or servers that hold local data without exchanging the local data between the edge devices. In one example, edge devices perform local training and provide training results to an aggregator device, which aggregates the training results among the multiple edge devices to update a centralized model, which can then be re-distributed to the edge devices for subsequent training and/or use. Cryptography may be used in a data aggregation process (e.g., federated learning) in order to protect data during transmission, such as between edge devices and an aggregator device. For example, edge devices may encrypt local data before sending it to the aggregator device, such as sharing an encryption key with the aggregator device via a separate secure channel, and the aggregator device may encrypt a final result of aggregation (e.g., a centralized model) in a similar manner before sending it back to the edge devices. Furthermore, in some cases data may be aggregated at multiple hierarchical levels, with different aggregator devices aggregating data from devices of which they are a parent in the hierarchy.

While existing data aggregation techniques may protect data during transmission between endpoints, these techniques require the endpoints to be trusted with access to the unencrypted data. For example, an aggregator device must be trusted to access the local data from all participating edge devices. Furthermore, existing data aggregation techniques rely on fixed cryptographic techniques, such as those that the software applications performing the operations related to data aggregation are configured to support, and these fixed cryptographic techniques may not be optimal for the varying contexts in which data aggregation techniques are performed.

Furthermore, existing techniques generally involve each endpoint in a multi-endpoint aggregation process selecting cryptographic techniques independently or in concert (e.g., based on publicly shared preferences and/or other attributes, such as through a cipher negotiation process), but do not provide any mechanism by which cryptographic standards may be attested to and/or enforced across multiple hops.

As such, there is a need for improved techniques for orchestrating cryptographic operations across multiple endpoints in order to ensure that cryptographic standards are met by all endpoints.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1A:
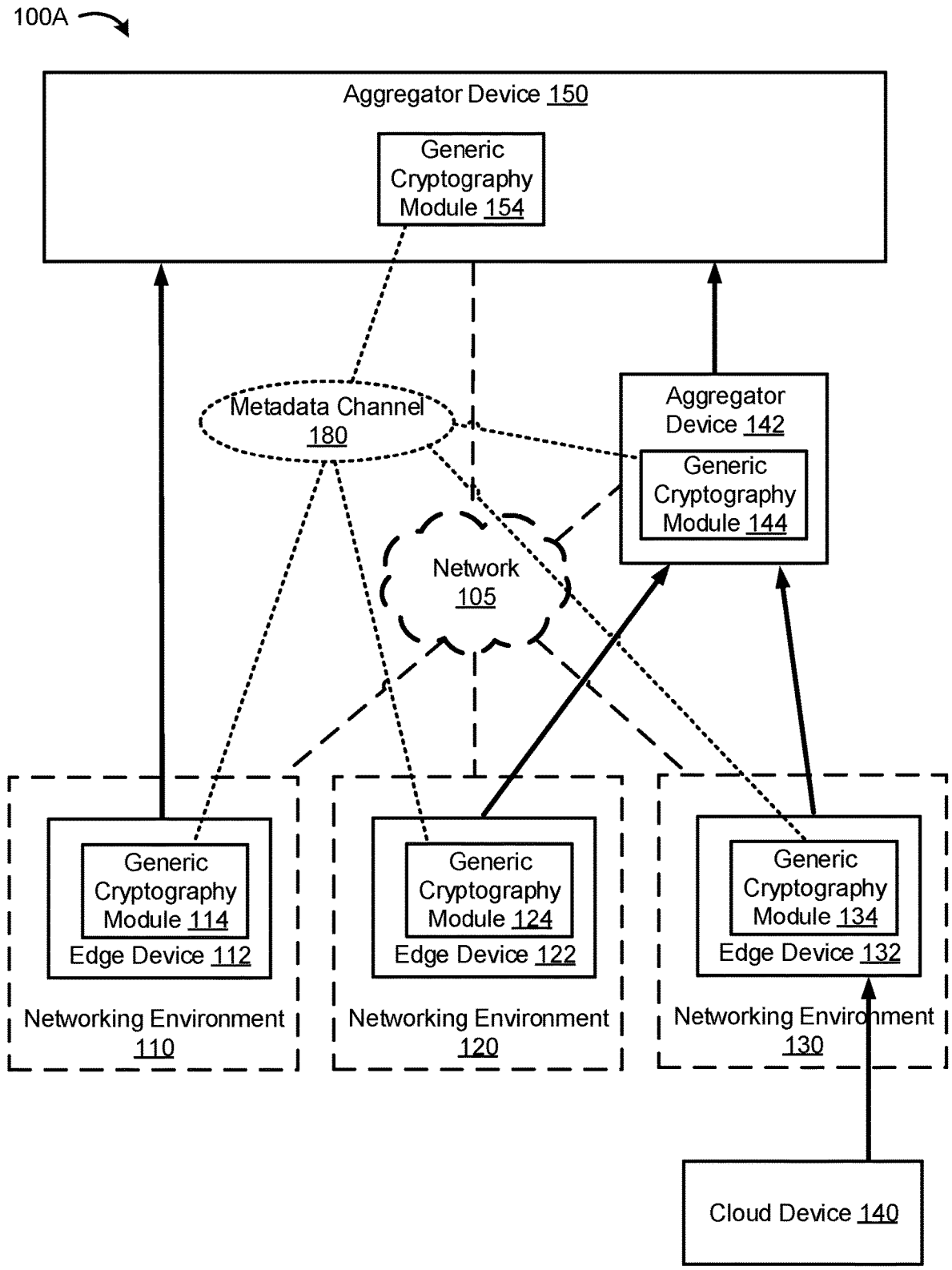
FIG. 1A is an illustration of example computing components related to multi-endpoint cryptographic orchestration, according to embodiments of the present disclosure.

The present disclosure relates to multi-endpoint cryptographic orchestration in a cryptographic agility system. In particular, the present disclosure provides an approach for attestation and enforcement of cryptographic requirements across multiple endpoints involved in a secure communication session managed by a cryptographic agility system. In certain embodiments, a secure metadata channel is established between multiple endpoints for use in communicating cryptographic requirements and attestations that cryptographic operations that are performed comply with such cryptographic requirements.

Cryptographic agility generally refers to techniques for dynamic selection and/or configuration of cryptographic algorithms, including through secure multi-endpoint cipher negotiation. According to certain embodiments, logic related to selection and/or configuration of cryptographic algorithms is decoupled from the applications that utilize cryptographic functionality, and is implemented in one or more separate components. Thus, rather than an application directly calling a cryptographic library to perform cryptographic functionality, the application may call generic cryptographic functions provided by a separate cryptographic agility system, and the cryptographic agility system may then select and/or configure cryptographic algorithms, such as based on contextual information and/or policies and, in some embodiments, based on a privacy-preserving cipher negotiation process with one or more other endpoints. For instance, the cryptographic agility system may dynamically determine which libraries, algorithms, configuration values, and/or the like to select based on factors such as the type of data being encrypted, the type of application requesting encryption, the network environment(s) in which the data is to be sent, a destination to which encrypted data is to be sent, geographic locations associated with a source and/or destination of the data, attributes of users associated with the encryption, regulatory environments related to the encryption, network conditions, resource availability, performance constraints, device capabilities, and/or the like. For example, the selection process may be based on attributes related to multiple devices involved in a data aggregation process, such as devices from which data is sent to one or more aggregator devices as well as the one or more aggregator devices themselves.

According to embodiments of the present disclosure, cryptographic techniques are dynamically selected based on attributes related to a multi-endpoint secure communication session (e.g., a federated learning process), such as whether an aggregator device is trusted to access the data being aggregated, whether the aggregator device has one or more types of hardware required for confidential computing, hardware/resource constraints of the devices involved in the process, based on the mathematical operations to be performed by an aggregator device in order to produce an aggregated result (e.g., in the case of homomorphic encryption), and/or the like. In a particular example, different types of confidential computing techniques and/or homomorphic encryption algorithms may be dynamically selected for privacy-preserving data aggregation based on a variety of factors.

Examples of privacy-preserving data aggregation processes include federated learning, industrial information aggregation (e.g., processes in which data from multiple endpoints is aggregated without any result of the aggregation being sent back to the endpoints), and/or the like. Embodiments of the present disclosure may be employed for any type of process in which data from multiple endpoints is aggregated, whether federated learning, information aggregation in which results of aggregation are not sent back to the endpoints, or another type of data aggregation.

An aggregator device may in some cases not be trusted with access to data being aggregated. For example, if local model gradients, parameter data, and/or participant data are sent from a plurality of endpoints to an aggregator device for aggregation, there is a possibility that sensitive local data could be reconstructed from these data points. Furthermore, such data may be vulnerable to side channel attacks or insider attacks at the aggregator device. A compromised operating system or other software associated with the aggregator device could also gain access to sensitive data while it is being processed at the aggregator device.

Confidential computing generally refers to computing techniques that isolate sensitive data in a protected processor enclave during processing. The enclave may be referred to as a trusted execution environment (TEE). The contents of the enclave, including the data that is processed and the logic used to process the data, are accessible only to authorized programming code, and are invisible and inaccessible to any other components outside of the enclave. Such an enclave or TEE may be an example of a confidential computing component as discussed herein. Confidential computing provides many advantages, such as the ability to perform computations on sensitive data without exposing the sensitive data to any entities outside of the secure enclave, including not exposing the sensitive data to any other components of the device on which the secure enclave is located and/or to an entity that operates such a device (e.g., a cloud provider). Furthermore, confidential computing is generally resource-efficient with respect to processor, memory, and network resources. However, confidential computing requires specialized hardware (e.g., a secure processor enclave), and so cannot be performed in the absence of such hardware.

Homomorphic encryption generally refers to encryption techniques that allow one or more types of mathematical operations to be performed on encrypted data without decryption and without exposing the underlying data. With homomorphic encryption, the result of performing a mathematical operation on the encrypted data remains in an encrypted form that, when decrypted, results in an output that is identical to that produced had the mathematical operation been performed on the unencrypted data. Homomorphic encryption techniques can be resource-intensive with respect to processor, memory, and network resources, but do not generally require specialized hardware.

There are different types of homomorphic encryption algorithms that support different types of mathematical operations. For example, some homomorphic encryption algorithms only allow addition to be performed on the encrypted data, some homomorphic encryption algorithms allow multiplication to be performed on the encrypted data, and some homomorphic algorithms are "fully homomorphic" such that they support the full range of possible mathematical operations on the encrypted data. Generally, a fully homomorphic encryption algorithm allows the evaluation of arbitrary circuits composed of multiple types of gates of unbounded depth and is the strongest notion of homomorphic encryption.

Different homomorphic encryption algorithms have different levels of security and/or vary in the amount of computing resources (e.g., processing, memory, and/or network resources) that are utilized during encryption, decryption, and transmission of encrypted data. For example, fully homomorphic encryption algorithms are generally resource-intensive, and so cannot be used on devices with limited available computing resources. Furthermore, there are many different types of fully homomorphic encryption techniques and many different types of partially homomorphic encryption techniques, including many different potential configurations of many different potential algorithms associated with many different potential libraries, and selection among these different techniques may be based on a variety of factors, such as the mathematical operations to be performed, the resource-efficiency of these techniques, the level of security of these techniques, attacks protected against, device limitations, and/or the like. When determining whether to select a fully homomorphic encryption technique or a partially homomorphic encryption technique, a cryptographic agility system as described herein may consider the cost in computing resources given the nature of the aggregation to be performed, the availability of acceleration hardware that could be utilized for particular types of homomorphic encryption (e.g., fully homomorphic encryption), device hardware provisioning, and/or the like.

Additionally, there may be many different types of confidential computing, including different technologies (e.g., different secure enclaves), different libraries, different confidential computing based aggregation libraries, and/or the like.

Thus, according to embodiments of the present disclosure, different types of cryptographic techniques, including but not limited to homomorphic encryption techniques and/or confidential computing techniques (e.g., including many different algorithms/technologies with many different configurations), may be dynamically selected for different situations based on, for example, the resource constraints and capabilities of one or more devices from which data is aggregated, the resource constraints and capabilities of one or more aggregator devices, which mathematical operations are to be performed by the one or more aggregator devices, required level(s) of security with respect to the involved devices, and/or the like. For example, when determining whether to select a confidential computing technique, a cryptographic agility system as described herein may consider the availability of the required technology on the platform (e.g., whether a secure enclave is present), the amounts of resources available (e.g., memory size and computation capacity), whether attestation can successfully be performed (e.g., if the aggregator device has the capability to attest to the accuracy and confidential nature of computations that are performed), availability of confidential computing libraries and secure aggregation implementations, and/or the like.

In some cases, a mix of confidential computing and homomorphic encryption may be selected for handling a particular cryptographic request, such as using one or more confidential computing techniques for some operations and using one or more homomorphic encryption techniques for other operations.

The cryptographic agility system may, for instance, determine estimated processing requirements, memory requirements, device requirements, and the like for different cryptographic techniques, such as based on tags associated with the cryptographic techniques, and may use this information in conjunction with information about available processing resources, available memory resources, device capabilities, and the like for devices that are to perform cryptographic operations in order to dynamically select cryptographic techniques for particular circumstances, such as for particular data aggregation processes.

In certain embodiments different cryptographic techniques may be selected for different devices involved in a single multi-endpoint secure communication session such as a data aggregation process based on factors that differ between the devices. For example, different devices may have differing resource constraints and capabilities, differing security requirements (e.g., based on locations or organizations with which the devices are associated), may perform differing mathematical operations (e.g., if multiple layers of aggregation are involved and different operations are performed at different layers), and/or the like. Thus, some embodiments may involve securely translating between cryptographic techniques in a privacy-preserving manner, such as through the use of a confidential computing environment.

A cipher negotiation process may be performed in order to select one or more cryptographic techniques for use in a multi-endpoint secure communication session. For example, such a cipher negotiation process may involve each endpoint specifying one or more requirements, policies, and/or other attributes, and such attributes may be used to select one or more cryptographic techniques, one or more types of cryptographic techniques, and/or one or more cryptographic requirements more generally that are consistent with the attributes from all endpoints.

In one example, multiple endpoints involved in a data aggregation process perform a privacy-preserving cipher negotiation process in order to select one or more cryptographic techniques for use in the data aggregation process. For example, a cryptographic server associated with each endpoint may provide cryptographic technique selection as a service, such as allowing endpoints to request privacy-preserving cryptographic operations via one or more application programming interface (API) calls, and the cryptographic servers associated with the endpoints may negotiate with one another to select one or more cryptographic techniques that comply with preferences, constraints, and other attributes related to the involved devices and the data aggregation process.

In one example, local models at multiple edge devices are being trained based on local data that is sensitive (e.g., medical information, personally identifiable information (PII), classified information, private user data, and/or the like) and yet there is a desire to train a global model that is not biased by the potentially unique attributes of the local data. One or more of the edge devices may initiate a cryptographic technique selection process, such as by communicating with an associated cryptographic server (e.g., via an API), and the cryptographic servers associated with the edge devices may engage in a privacy-preserving cipher negotiation process. According to certain embodiments, a secure multiparty computation technique is used to perform the cipher negotiation in order to preserve the privacy of the endpoints' attributes.

In some embodiments, a variety of factors may be considered in a privacy-preserving cipher negotiation process to dynamically select an encryption technique for a privacy-preserving data aggregation process. For example, policies may be defined by users (e.g., administrators), and may specify rules for selecting and/or configuring (e.g., setting particular parameters of) cryptographic techniques. Policies may specify, for example, conditions under which cryptographic techniques must comply with one or more standards (e.g., Federal Information Processing Standards or FIPS), when a quantum-safe cryptographic technique must be selected, how to select among different quantum-safe cryptographic techniques, conditions for selecting key sizes (e.g., based on a desired level of security or based on different algorithm standards such as particular elliptical curves), and/or the like. In one example, cryptographic techniques (e.g., algorithms and/or configurations of algorithms) are tagged with different levels of security (e.g., rated from 0-10), and a policy associated with an application may specify that all data that is to be transmitted from the application to a destination in a given type of networking environment, such as a public network, is to be encrypted using a high-security algorithm (e.g., rated 8 or higher). Thus, if the application calls a function provided by the cryptographic agility system to encrypt an item of data for a data aggregation process, and contextual information indicates that the data is to be transmitted to a device (e.g., an aggregator device) on a public network, then the cryptographic agility system, in certain embodiments, will select a cryptographic technique tagged as a high-security technique, such as with a security rating of 8 or higher, such as in addition to being a homomorphic encryption algorithm that supports the required mathematical operations and otherwise complies with parameters from all endpoints involved in the process. In another example, a policy may specify that confidential computing is to be used for all cryptographic requests related to privacy-preserving data aggregation that are associated with a particular geographic region, organization, and/or locality and/or that homomorphic encryption is to be used for all cryptographic requests related to privacy-preserving data aggregation that are associated with another particular geographic region, organization, and/or locality. This may be due to differing preferences with respect to confidential computing and/or homomorphic encryption associated with different regions, countries, organizations, and/or the like. In another example, cryptographic techniques are tagged with indications of whether they comply with particular standards, and a policy may specify that all data associated with a particular application or for a particular purpose is to be encrypted with a cryptographic technique that complies with a particular standard (e.g., FIPS). In such an example, if an application calls a function provided by the cryptographic agility system to encrypt an item of data, and contextual information indicates that the data relates to the particular purpose or that the application is the particular application, then the cryptographic agility system, in certain embodiments, will select a cryptographic algorithm tagged as being compliant with the particular standard.

In yet another example, cryptographic techniques are tagged with indications of whether they have certain characteristics or support certain configurations, and a policy may specify that all data that is to be transmitted as part of a data aggregation process is to be encrypted using a cryptographic technique that does or does not have one or more particular characteristics or configurations. Thus, if the cryptographic agility system receives a request to encrypt an item of data for a data aggregation process, then the cryptographic agility system, in certain embodiments, will select a cryptographic algorithm tagged with indications that the cryptographic algorithm does or does not have the one or more particular characteristics or configurations indicated in the policy. Accordingly, an organization or user may specify policies based on their own preferences of which characteristics or configurations of cryptographic techniques are most secure or desirable and/or based on specific compliance requirements.

As a result of the cipher negotiation process and/or based on one or more other factors, one or more cryptographic requirements for the secure communication sessions are determined. For example, the one or more cryptographic requirements may include specific cryptographic techniques, specific types of cryptographic techniques, attributes of cryptographic techniques, and/or the like that will govern the cryptographic operations to be performed in association with the multi-endpoint secure communication session.

In some embodiments, if homomorphic encryption is used, multiple endpoints that send homomorphically encrypted data to an aggregation device may encrypt local data using a single encryption key that is shared across the endpoints (but not with the aggregation device) and/or may use different encryption keys, such as using a multi-key homomorphic encryption scheme (e.g., so that one endpoint is unable to decrypt the local data from another endpoint even if it were to obtain such local data). Thus, cryptographic requirements that are dynamically selected through a cipher negotiation process and attested to and enforced via a metadata channel as described herein may involve, for example, use of a single-key homomorphic encryption technique or a multi-key homomorphic encryption technique. In some cases, such as when the endpoints are associated with independent organizations or geographic locations, a multi-key homomorphic encryption technique may be preferred to a single-key homomorphic encryption technique because of the added security, and the cipher negotiation process may select a multi-key technique accordingly.

According to embodiments of the present disclosure, a metadata channel is established between the endpoints involved in the secure communication session. The metadata channel may be a secure communication channel that allows cryptographic requirements to be communicated and also allows attestations of compliance with such cryptographic requirements to be communicated among the endpoints. The metadata channel may be distinct from a data exchange that takes place during the secure communication session between the endpoints. For example, the metadata channel may facilitate negotiation between the endpoints of one or more cryptographic techniques that are to be used for such a data exchange. In an embodiment, cryptographic provider components associated with each endpoint are configured to enforce cryptographic requirements according to metadata communicated via the metadata channel, such as being configured to only select and perform cryptographic techniques for a given communication session that comply with cryptographic requirements for the communication session that are communicated via the metadata channel. The cryptographic provider components may further send attestations via the metadata channel in order to attest that cryptographic operations performed by the cryptographic provider components comply with the cryptographic requirements. In one example implementation, a data structure sent by a first cryptographic provider via the metadata channel may include an indication of one or more cryptographic requirements and a field to be updated by other cryptographic provider components attesting that they have complied with the one or more cryptographic requirements.

In some cases, data sent via the metadata channel may be encrypted in order to preserve security of the cryptographic requirements and corresponding attestations. For example, a first cryptographic provider component may encrypt an indication of cryptographic requirements using a public key of a second cryptographic provider component and send the encrypted indication to the second cryptographic provider via the metadata channel. The second cryptographic provider component may decrypt the indication, perform one or more cryptographic operations in accordance with the indicated cryptographic requirement(s), and then send an encrypted attestation, such as using a public key of the first cryptographic provider component.

In certain embodiments, a secure digital ledger such as a blockchain may be used to store records of attestations that are sent via the metadata channel. For example, sending an attestation via the metadata channel may cause the attestation to be written to the secure digital ledger in order to create an auditable record of compliance with cryptographic requirements.

It is noted that, while certain operations may be described as being performed by the endpoints, some of these operations may be performed by cryptographic servers (e.g., comprising cryptographic provider components) associated with the endpoints rather than by the endpoints themselves.

By decoupling cryptographic logic from applications that rely on cryptographic functionality for performing privacy-preserving data aggregation operations, cryptographic agility techniques described herein provide flexibility and extensibility, thus allowing cryptographic techniques to be continually updated, changed, and otherwise configured without requiring modifications to the applications themselves, such as allowing for the utilization of new types of confidential computing and/or homomorphic encryption that are not natively supported by the application. Accordingly, changing circumstances may be addressed in a dynamic and efficient manner, and computing security may thereby be improved. For example, endpoints may utilize techniques described herein to dynamically select privacy-preserving cryptographic techniques for use in encrypting local parameters to send to an aggregator device, and the aggregator device may utilize techniques described herein to encrypt a global model trained based on aggregating the received local parameters from the endpoints. In some embodiments, the aggregator device may not need to encrypt the global model, as it may have been generated based on homomorphically encrypted local parameters, and thus the global model parameters may remain encrypted until they are unencrypted by the endpoints upon receipt.

According to embodiments of the present disclosure, cryptographic techniques are dynamically selected and/or configured for use in multi-endpoint secure communication sessions based on additional factors such as network and/or resource constraints. In some cases, a cryptographic algorithm may be referred to as a "cipher". Cryptographic algorithms have varying resource requirements, such as different memory, processing, and/or communication resource requirements. For example, some algorithms are more computationally-intensive than others and some algorithms involve storage and/or transmission of larger amounts of data than others. For example, algorithms involving larger key sizes or ciphertext sizes generally require larger amounts of memory and/or network communication resources than algorithms with smaller key sizes or ciphertext sizes. In another example, the larger the number of bits of security used in an algorithm, the more processing-intensive the algorithm will generally be.

In a cryptographic agility system, an initial stage of selecting a cryptographic technique may involve ensuring that the security requirements for a given cryptographic operation, such as a level of security required by policy and/or context information, are met. However, there may be multiple algorithms and/or configurations of algorithms that meet these requirements. Thus, techniques described herein involve factoring the availability of specialized hardware, operation-related considerations (e.g., which mathematical operations are to be performed in a data aggregation process), resource-related considerations, and/or the like into the determination of which algorithms and/or configurations to use, such as based on information associated with a request and/or based on device and/or network performance metrics and/or capability information.

Cryptographic techniques may be tagged, such as by an administrator or expert, based on whether they are privacy-preserving, whether they are homomorphic, supported mathematical operations, based on resource requirements, and based on levels of security, threats protected against, and/or the like. For example, a given technique may be tagged with an indication of required hardware, supported mathematical operations (e.g., in the case of homomorphic encryption), and/or with a classification with respect to each of memory requirements, processing requirements, network resource requirements, and/or the like. Classifications may take a variety of forms, such as high, medium, and low, numerical scales (e.g., 0-10), binary indications, and/or the like. In some embodiments, classifications may be imported from one or more sources, such as cryptographic technique providers, open source entities, standards bodies, and/or the like. In some embodiments, rather than individual cryptographic techniques being tagged, types of cryptographic techniques are tagged with attribute such as required hardware, supported mathematical operations and/or classifications relating to various types of resource requirements. In one example, a tag may indicate that all "additive" homomorphic encryption algorithms support addition. In another example, a tag may indicate that all fully homomorphic encryption algorithms are associated with a high processing resource requirement. In yet another example, a tag may indicate that all confidential computing techniques are associated with a low processing resource requirement. In still another example, a tag may indicate that all techniques that involve the use of an accelerator are associated with a high processing resource requirement. An accelerator is a hardware device or a software program that enhances the overall performance of a computer, such as by processing data faster than a central processing unit (CPU) of the computer (e.g., which may be referred to as a compute accelerator). It is noted that CPUs may in some cases have special instructions for accelerating cryptographic operations, such as the Advanced Encryption Standard New Instructions (AES-NI) instruction set from Intel®, and a tag may indicate that a cryptographic technique is or is not compatible with such special instructions. Furthermore, cryptographic techniques may be tagged with indications of capability requirements, such as whether an accelerator and/or other specialized hardware is required.

When a cryptographic request is submitted by an application, the cryptographic agility system may gather information associated with the request (e.g., from the request itself, from metadata associated with the request, and/or through communication with one or more other components) related to a privacy-preserving data aggregation process. Furthermore, the cryptographic agility system may gather information related to resource conditions and/or capabilities of the network(s) and/or device(s) related to the cryptographic request. For instance, the cryptographic agility system may gather current resource availability (e.g., based on capacity and utilization), performance metrics, capability information, and the like for the device(s) and/or network(s) to which the request relates. Techniques for gathering such information are known in the art and may involve, for example, including contextual information in the cryptographic request, communication with one or more performance monitoring components, communication with the involved devices, and/or the like. As described herein, secure multiparty computation techniques may be used to negotiate selection of a cryptographic technique among multiple endpoints based on various attributes related to the endpoints. For example, an endpoint acting as an evaluator may evaluate one or more encrypted functions, using encrypted endpoint attributes as input parameters, in order to select one or more cryptographic techniques, and may share results of the evaluation and/or selection process with the other endpoints.

In some cases, multiple cryptographic algorithms and/or configurations of algorithms may be used to service a single cryptographic request and/or for a single aggregator device. For instance, if a new, more secure cryptographic algorithm has recently become available but is not yet certified by a particular organization, and a particular cryptographic request requires cryptography that is certified by the particular organization, a certified algorithm may first be used and then the new algorithm may be used on top of the certified algorithm to provide the added level of security.

In some embodiments, attribute based encryption (ABE) techniques may be used in order to provide more fine-grained access control for encrypted data that is sent by endpoints to an aggregation device. For example, ABE techniques may allow multiple private keys to be used with a single public key, such as allowing each endpoint in a data aggregation process to use a distinct private key, while all of the endpoints may use a common public key that is constructed from a list of attributes such that any party that has all of the attributes can decrypt the data.

According to certain embodiments, cryptographic techniques used for a data aggregation process may be centrally selected and/or orchestrated, such as by the aggregator device, one of the endpoints, or another centralized component. For example, the centralized component may invoke generic cryptographic functionality provided by the cryptographic agility system described herein (e.g., a generic cryptography module may be located on the same device as the centralized component or may be otherwise in communication with the centralized component) in order to dynamically select one or more cryptographic techniques for use in a privacy-preserving data aggregation process involving a plurality of endpoints and one or more aggregator devices, such as providing contextual information related to the data aggregation process to the cryptographic agility system. In some cases, the endpoints (and, in some embodiments, the aggregator device) may transmit local contextual information to the centralized component (e.g., securely, such as in encrypted form), such as via a metadata channel as described herein, and the centralized component may use the contextual information received from the endpoints to provide contextual information to the cryptographic agility system, such as based on a lowest common denominator across the contextual information received from the endpoints or some other aggregation of the contextual information received from the endpoints. The cryptographic agility system may then dynamically select one or more cryptographic techniques for use in the data aggregation (e.g., based on the contextual information as described herein) and provide information about the selected one or more cryptographic techniques to the centralized component. The centralized component may then distribute at least subsets of the information about the one or more selected cryptographic techniques to the endpoints (and, in some embodiments, to the aggregator device) such that the endpoints can use the selected one or more cryptographic techniques to encrypt local data prior to sending such local data to the aggregator device. The endpoints may perform encryption using the selected one or more cryptographic techniques themselves or may interact with one or more other components, such as one or more generic cryptography modules, to perform the encryption. The aggregator device may be provided with instructions (e.g., by the centralized component) indicating whether the aggregator device is to decrypt the received local parameters (e.g., if non-homomorphic encryption is used), to perform aggregation on the encrypted local parameters (e.g., if homomorphic encryption is used), to use a confidential computing component, and/or the like.

Embodiments of the present disclosure improve upon conventional cryptography techniques for multi-endpoint secure communication sessions in which cryptographic algorithms are pre-determined for applications (e.g., at design time), in which multiple endpoints must share their local parameters with one another or with a third party in order to negotiate a cryptographic technique, and in which there is no mechanism for attesting to and/or enforcing compliance with cryptographic requirements. For example, techniques described herein improve upon such techniques by providing for the dynamic selection of privacy-preserving encryption techniques that are tailored for the operations to be performed and for the devices and networks involved, that may not be natively supported by the applications involved in data aggregation processes, without requiring sharing potentially sensitive local parameters with other endpoints, and while providing mechanisms for ensuring compliance with cryptographic requirements across multiple hope. By selecting targeted encryption algorithms and/or configurations and/or confidential computing techniques based on the operations to be performed and based on network and/or resource constraints of different devices and/or networks through a cipher negotiation process and providing for attestation and enforcement of cryptographic requirements determined through such a process, techniques described herein improve the functioning of devices and networks on which cryptographic operations are performed by ensuring that cryptographic operations do not burden devices or networks beyond their capacity or capabilities while preserving the privacy of local data and ensuring required levels of security. Furthermore, embodiments of the present disclosure improve information security by ensuring that the most secure and updated cryptographic techniques that are consistent with required operations and with device and network constraints may be utilized by an application, even if such techniques were not available at the time the application was developed.

Additionally, techniques described herein may facilitate an organization's use of uniform policy configuration (e.g., a suite of coordinated policies), such as to orchestrate cryptographic usage across many endpoints (e.g., involved in a federated learning process), without requiring any given endpoint to be aware of any other endpoint's local parameters. Embodiments of the present disclosure may also be used to facilitate migration to new homomorphic encryption algorithms at scale and/or to remove deprecated homomorphic encryption algorithms from use in a centralized and coordinated manner.

The metadata channel described herein allows endpoints to securely communicate with one another regarding cryptographic requirements for a multi-endpoint secure communication session and to securely attest to compliance with such requirements in a verifiable manner, thereby overcoming deficiencies with existing cryptographic systems and improving computing security. Furthermore, by writing such attestations to a secure digital ledger (e.g., which may be triggered automatically when such attestations are sent via the metadata channel), embodiments of the present disclosure provide improved auditability and compliance enforcement, such as through the use of smart contracts on such a digital ledger to confirm compliance.

FIG. 1A is an illustration 100A of example computing components related to attestation and enforcement of cryptographic requirements across multiple endpoints, according to embodiments of the present disclosure.

An example of a multi-endpoint secure communication session is a federated learning process in which multiple endpoints, such as edge devices 112, 122, and 132, in separate networking environments 110, 120, and 130 send local model parameters to aggregator device 142 150 (e.g., with another aggregator device 142 performing aggregation at an intermediate hierarchical level) for aggregation, and aggregator device 150 sends a global model produced as a result of the aggregation back to the endpoints. It is noted that federated learning does not necessarily involve the creation of a global machine learning model and could also involve the creation of global learned parameters or determinations that are sent back to the endpoints. As such, the term model as used herein is not intended to limit federated learning processes to the creation of machine learning models. Furthermore, other types of multi-endpoint secure communication sessions may also be performed with techniques described herein.

Networking environments 110, 120, and 130 may be separate networks, such as data centers (e.g., physical data centers or software defined data centers), cloud environments, local area networks (LANs), and/or the like. In certain embodiments, networking environments 110, 120, and 130 are private networking environments that implement security mechanisms (e.g., firewalls) to prevent unauthorized access. Edge devices 112, 122, and 132 represent physical or virtual devices that provide entry points into networking environments 110, 120, and 130. For example, in some embodiments, communications to and from networking environment 110 are received and/or transmitted via edge device 112, communications to and from networking environment 120 are received and/or transmitted via edge device 122, and communications to and from networking environment 130 are received and/or transmitted via edge device 132. Edge devices 112, 122, and 132 may communicate with one another and with aggregator devices 142 and/or 150 via a network 105, with may be any sort of connection over which data may be transmitted. In certain embodiments, network 105 is a wide area network (WAN) such as the Internet.

Each of aggregator devices 142 and 150 generally represents a physical or virtual device that performs aggregation functionality for a federated learning process. Aggregator device 142 and/or 150 may be located, for example, in one or more public networking environments, such as a public cloud. In one example, aggregator device 142 and/or 150 is a cloud service. In other examples, aggregator device 142 and/or 150 may be located in one of networking environments 110 or 120 and/or may be located in a different private or public networking environment.

One or more of aggregator devices 142 and 150 may optionally include a confidential computing component, such as a secure processor enclave of a processing device. A confidential computing component generally refers to a hardware-backed secure environment that shields code and data from observation or modification by any components outside of the secure environment, thus reducing the burden of trust on a computer's operating system or hypervisor while allowing computations to be performed on the data within the secure environment. Such a confidential computing component may, for example, provide a secure environment through a partitioning process in which the central processing unit (CPU) places hardware checks on the memory allocated to each component such as a virtual machine (VM) on an aggregator device and ensures these boundaries are not crossed, or through a memory encryption process in which the CPU automatically encrypts VM memory with different keys for different VMs. A confidential computing component may also provide such a secure environment through a combination of these techniques, and/or through one or more other techniques.

Edge devices 112, 122, and 132 communicate with generic cryptography modules 114, 124, and 134 in order to perform cryptographic functionality related to the federated learning process. As described in more detail below with respect to FIG. 2, generic cryptography modules 114, 124, and 134 may be physical or virtual computing devices, such as server computers or virtual computing instances (VCIs), on which components of a cryptographic agility system reside. For example, generic cryptography modules 114, 124, and 134 generally perform operations related to dynamically selecting cryptographic techniques (e.g., based on contextual information related to requests for cryptographic operations), performing the requested cryptographic operations according to the selected techniques, and providing results of the operations to the requesting components. It is noted that while generic cryptography modules 114, 124, and 134 are shown within edge devices 112, 122, and 132, these generic cryptography modules may alternatively be implemented on separate devices from edge devices 112, 122, and 132.

A metadata channel 180 is established between generic cryptography modules 114, 124, and 134, as well as with generic cryptography modules 144 and 154 on aggregator devices 142 and 150. As described in more detail below with respect to FIG. 3, metadata channel 180 may allow generic cryptography modules to securely specify cryptographic requirements related to a multi-endpoint secure communication session (e.g., a federated learning process) and to securely attest to compliance with such cryptographic requirements. Generic cryptography modules 114, 124, 134, 144, and 154 may be configured to comply with cryptographic requirements sent via metadata channel 180 such that sending such cryptographic requirements via metadata channel 180 causes those cryptographic requirements to be enforced. Furthermore, as described in more detail below with respect to FIG. 4, attestations of compliance with cryptographic requirements that are sent via metadata channel 180 may also be written to a secure digital ledger in order to improve auditability and enforcement. For example, sending such an attestation via metadata channel 180 may automatically trigger creating a corresponding entry on a secure digital ledger.

In an example, edge devices 112, 122, and/or 132 send requests to generic cryptography modules 114, 124, and/or 134 to encrypt local data (e.g., local model parameters determined through a local model training process based on local training data), such as indicating that the requests relate to a privacy-preserving data aggregation process, indicating one or more attributes of edge devices 112, 122, and/or 132, indicating one or more attributes of aggregator device 142 and/or 150, indicating one or more types of mathematical operations to be performed by aggregator device 142 and/or 150, and/or the like in the requests. Generic cryptography modules 114, 124, and 134 (and, in some embodiments, generic cryptography modules 144 and/or 154) dynamically select one or more cryptographic techniques such as involving confidential computing or homomorphic encryption algorithms based on attributes associated with the request, such as whether required specialized hardware is available, the operations to be performed, other computing resource and/or capability constraints, policy considerations, and/or the like. The involved generic cryptography modules communicate with each other to perform a cipher negotiation, such as via a secure channel established between them, to coordinate aspects of the one or more selected encryption techniques. While not required, some embodiments may involve utilizing metadata channel 180 for such secure communications related to a cipher negotiation.

The cipher negotiation may in some embodiments involve a secure computation process by which one or more encryption techniques are selected to service the requests from edge devices 112, 122, and/or 132 based on encrypted attributes associated with the request. For example, an encrypted function may be generated that accepts encrypted inputs and produces a result that matches a result that would be produced by providing the unencrypted inputs to the unencrypted function. In some cases, more than one such encrypted function is used. The results of evaluating the encrypted function(s) may be used to select one or more cryptographic techniques that comply with the parameters. The unencrypted local parameters of known to the involved generic cryptography modules may not be shared between separate networking environments, thus preserving the privacy of the parameters. Alternative techniques for performing a multi-endpoint cipher negotiation may alternatively or additionally be used. For example, some embodiments may involve the generic cryptography modules sharing local parameters with one another without using secure computation techniques, and/or may involve providing local parameters from the generic cryptography modules to a separate device (e.g., a trusted device) that determines which cryptographic techniques comply with all of the parameters.

In an example, after selecting a cryptographic technique based on a cipher negotiation, two or more of the involved generic cryptography modules may securely share one or more encryption keys that are used at the two or more involve generic cryptography modules to encrypt local data. In another example, two or more generic cryptography modules coordinate a multi-key encryption scheme with one another so that a key does not need to be shared between the generic cryptography modules. In some embodiments, generic cryptography modules 114, 124, and/or 134 coordinate with generic cryptography module(s) 142 and/or 150 associated with aggregator devices 142 and/or 150 as well, such as indicating one or more selected cryptographic techniques.

After dynamically selecting one or more cryptographic requirements based on a cipher negotiation, metadata channel 180 may be used to communicate such cryptographic requirements between the generic cryptography modules. For example, the cryptographic requirements may indicate specific cryptographic techniques, specific types of cryptographic techniques, attributes of cryptographic techniques, and/or the like that will govern the cryptographic operations to be performed in association with the multi-endpoint secure communication session. In some embodiments, the multi-endpoint secure communication session is assigned a unique identifier, and this identifier is used to identify the session in all applicable communications sent via metadata channel 180 (and, in some embodiments, all entries corresponding to the session that are stored on secure digital ledger). In certain cases, indication(s) of cryptographic requirement(s) may be encrypted when sent via metadata channel 180, such as using public key(s) of recipient generic cryptography module(s). While a single metadata channel 180 is shown, alternative embodiments involve establishing separate metadata channels between different pairs of generic cryptography modules and/or for different multi-endpoint secure communication sessions.

Generic cryptography modules 114, 124, and/or 134 may encrypt the respective local data using the selected technique(s) and return the respective encrypted local data to edge devices 112, 122, and 132 (and/or directly send the encrypted local data to the next hop, such as aggregation device 142 and/or 150). In alternative embodiments, generic cryptography modules 114, 124, and/or 134, rather than performing encryption themselves, may provide information to one or more other components to perform the selected encryption technique(s).

Generic cryptography modules 114, 124, and 134 may send attestations via metadata channel 180 indicating that they complied with the applicable cryptographic requirement(s) for the communication session. For example, the attestations may be sent by populating one or more fields of a data structure in which the indication(s) of cryptographic requirement(s) were earlier sent via metadata channel 180. The attestations may be sent in association with the unique identifier of the multi-endpoint secure communication session.

Furthermore, a separate cloud device 140 may also be involved in the multi-party secure communication session. Cloud device 140 is generally representative of a separate endpoint that is not directly associated with a crypto provider of the cryptographic agility system described herein, such as a third-party service. In one example, cloud device 140 provides additional data to be aggregated with the local parameters from edge device(s) 112, 122, and/or 132, and/or performs one or more operations with respect to local parameters from edge device 132.

Generic cryptography module 134 may assume responsibility for attestation and/or enforcement of applicable cryptographic requirements with respect to cloud device 140. For example, because cloud device 140 is not a crypto provider of the cryptographic agility system described herein, it may not be configured to automatically enforce cryptographic requirements communicated to it and/or it may not be directly connected to metadata channel 180. Thus, generic cryptography module 134 may be considered a "parent" of cloud device 140 that is responsible for any cryptographic operations performed by cloud device 140. In one example, generic cryptography module 134 establishes a secure connection to cloud device 140, communicates applicable cryptographic requirements to cloud device 140 via the secure connection, and requests some proof from cloud device 140 that cloud device 140 complied with such cryptographic requirements. In one case, cloud device 140 performs one or more cryptographic operations on data local to cloud device 140, and provides some type of proof to generic cryptography module 134 the cryptographic technique(s) used by cloud device 140 are compliant with the cryptographic requirements for the session. The proof may be, for example, a zero knowledge proof as known in the art. In another example, the proof is a signature or attestation of a confidential computing component (e.g., secure enclave) on cloud device 140 that performed one or more operations related to the session. In some cases, such as if cloud device 140 and generic cryptography module 134 are both trusted or authorized to access underlying data that was encrypted by cloud device 140, cloud device 140 may provide generic cryptography module 134 with specific details of the encryption operation(s) performed, such as one or more encryption keys, that can be verified by generic cryptography module 134 to comply with the cryptographic requirement(s). In some embodiments, cloud device 140 may send generic cryptography module 134 a digital signature verifying that it complied with the cryptographic requirement(s).

Generic cryptography module 134 may send an attestation via metadata channel 180 that cloud device 140 complied with the applicable cryptographic requirement(s) in a similar manner to that in which generic cryptography module 134 attests to its own compliance with such requirements. More generally, in some embodiments, cryptographic attestation and/or enforcement may be implemented at least partially in a hierarchical manner such that parent nodes in a hierarchy attest to compliance of their child nodes in the hierarchy (e.g., as needed, such as when child nodes are not crypto providers that are part of the cryptographic agility system described herein).

In an example, if a selected technique involves homomorphic encryption, then the encrypted data can be sent to aggregator device 142 and/or 150 without any encryption key being provided to aggregator device 142 and/or 150, and the aggregator device(s) can perform computations on the encrypted data without decryption. If the selected technique involves confidential computing, the data will be encrypted using an encryption algorithm (e.g., non-homomorphic) that otherwise complies with requisite factors, and one or more keys may be sent by generic cryptography modules 114, 124, and/or 134 via a secure channel directly to a confidential computing component on aggregator device 142 and/or 150 so that the encrypted data can be securely unencrypted within the confidential computing component using the key(s) in order to perform computations and the result of the computations can be encrypted within the confidential computing component using the key(s).

In the depicted example, edge devices 122 and 132 send encrypted local parameters (e.g., including encrypted data from cloud device 140) to aggregator device 142, which performs a first hierarchical level of aggregation functionality. Aggregator device 142 then provides a result of its aggregation operations to aggregator device 150. Generic cryptography module 114 provides its encrypted local parameters directly to aggregator device 150. Aggregator device 150 performs aggregation functionality with respect to the encrypted local parameters from generic cryptography module 114 and the results of aggregation performed by aggregator device 142. For example, networking environments 120 and 130 and aggregator device 142 may all be located within a given private networking environment that is separate from network environment 110 and aggregator device 150, and so all of the local parameters from within the given private networking environment may be aggregated by aggregator device 142 before being sent outside of the given private networking environment for aggregation at a higher hierarchical level at aggregator device 150 with other local parameters from outside of the given private networking environment. For example, aggregator device 142 and/or 150 may perform one or more mathematical operations, such as addition, subtraction, division, and/or multiplication in order to aggregate the local parameters received from various sources, either in encrypted form (in the case of homomorphic encryption), within a confidential computing environment, or after decrypting the local parameters (e.g., using one or more keys received from the endpoints, such as in the case of non-homomorphic encryption). In one example, aggregator device 150 calculates an average of encrypted or decrypted local parameters received from edge device 112 and aggregator device 142. In another example, in the case of confidential computing, aggregator device 150 may provide the encrypted local parameters to a confidential computing component, such as along with instructions to perform one or more mathematical operations, such as addition, subtraction, division, and/or multiplication in order to aggregate encrypted the local parameters. In such cases, the encrypted local parameters are decrypted within the confidential computing component (such that the unencrypted parameters cannot be accessed outside of the confidential computing component), the computations are performed to produce a result, and the result is encrypted before being sent outside of the confidential computing component. If the encrypted local parameters were encrypted using different encryption techniques and/or keys (e.g., which may have been separately provided to the confidential computing component by applicable generic cryptography modules, then the confidential computing component may encrypt the result of the computations with corresponding keys for sending the encrypted result to back to the different requesting components. Thus, each endpoint can decrypt the encrypted global model. Alternatively, the confidential computing component may encrypt the result of the computations using a different encryption technique altogether, and may send one or more encryption keys securely to applicable generic cryptography modules for use in decrypting the encrypted global model.

Generic cryptography module 144 and/or generic cryptography module 154 may determine cryptographic requirement(s) for any cryptographic operations to be performed at these endpoints based on indications sent via metadata channel 180. Generic cryptography module 144 and/or generic cryptography module 154 may further send attestation(s) via metadata channel 180 that any cryptographic operations performed on or in association with aggregation device(s) 142 and/or 150 as part of the multi-endpoint secure communication session (e.g., encrypting a global model) comply with the applicable cryptographic requirement(s).

It is noted that in many embodiments the number of participating endpoints (e.g., edge devices) will be larger than three. Furthermore, participating endpoints need not be edge devices, and edge devices are included as an example. Additionally, aggregation is not limited to averaging, and other types of aggregation computations may alternatively be performed. The local parameters that are aggregated to produce global parameters may include, for example, gradients, weights, hyperparameters, and/or the like, although other types of data may also be encrypted and transmitted between endpoints using techniques described herein.

In the case of homomorphic encryption, the results of computations performed by aggregator device 142 and/or 150 on encrypted local parameters will remain encrypted, such that aggregator device 142 and/or 150 will not have access to the unencrypted local parameters or the unencrypted global parameters (e.g., outside of a confidential computing component in the case of confidential computing). Aggregator device 150 may send an encrypted global model (e.g., produced as a result of the aggregation functionality, such as comprising the encrypted global parameters, which may in one example be the average of the local parameters) to edge devices 112, 122, and 132 (e.g., via aggregator device 142 in the case of edge devices 122 and 132).

Edge devices 112, 122, and 132 may decrypt the encrypted global model using the key(s) with which encrypted local parameters and were encrypted (or key(s) received from a confidential computing component or otherwise received from aggregator device 142 and/or 150) in order to determine the unencrypted global model. For example, edge devices 112, 122, and/or 132 may send requests to generic cryptography modules 114, 124, and/or 132 to decrypt the encrypted global model, and the generic cryptography modules may perform decryption and return the unencrypted global model to the edge devices (or the global model may be sent directly from the aggregator device(s) to the generic cryptography module(s) associated with the edge device(s)). In the case of homomorphic encryption, the unencrypted global model will be the same as if the computations performed by the aggregator device(s) had been performed on the unencrypted local data. In the case of confidential computing, the computations were performed on the unencrypted local data but within a secure environment. Thus, in such embodiments, edge devices 112, 122, and 132 are provided with a global model that benefits from the local training performed at all endpoints without being biased by peculiar attributes of local training data from any individual endpoint. Furthermore, in the case of homomorphic encryption or confidential computing, the privacy of the local data is preserved, as aggregator device 150 and/or 142 are never granted access to the unencrypted local data or the unencrypted global data (e.g., outside of confidential a computing component in the case of confidential computing), and the unencrypted local data is never shared between different endpoints. Additionally, computing resource constraints and capabilities of the computing devices and networks are respected through the dynamic selection of encryption techniques based on such constraints and capabilities, such as selecting one or more cryptographic techniques that are consistent with available hardware, that support the particular mathematical operations that are to be performed by the aggregator device(s) (and that comply with one or more additional policies), and/or that also are well-suited to the devices and networks involved in the multi-endpoint secure communication session. Through the use of metadata channel 180, compliance with applicable cryptographic requirement(s) is attested to and/or enforced in a secure manner such that the cryptographic operations performed at all hops can be demonstrated to all parties to be compliant. Furthermore, through the use of a secure digital ledger that stores records of attestations sent via metadata channel 180, auditability and enforcement of compliance with cryptographic requirements are further improved.

It is noted that while certain embodiments are described in which an aggregator device performs aggregation on encrypted data from endpoints and sends results of the aggregation back to the endpoints, other embodiments may involve the aggregation device acting as a sort of middle box that performs aggregation on encrypted data from endpoints and then sends results of the aggregation to one or more different endpoints (e.g., different than the endpoints from which the encrypted data was received). For example, the one or more different endpoints may be provided one or more decryption keys (e.g., used to generate the encrypted data) by the one or more endpoints, and the one or more different endpoints may use the one or more decryption keys to decrypt the results of the aggregation received from the aggregation device.

Figure 1B:
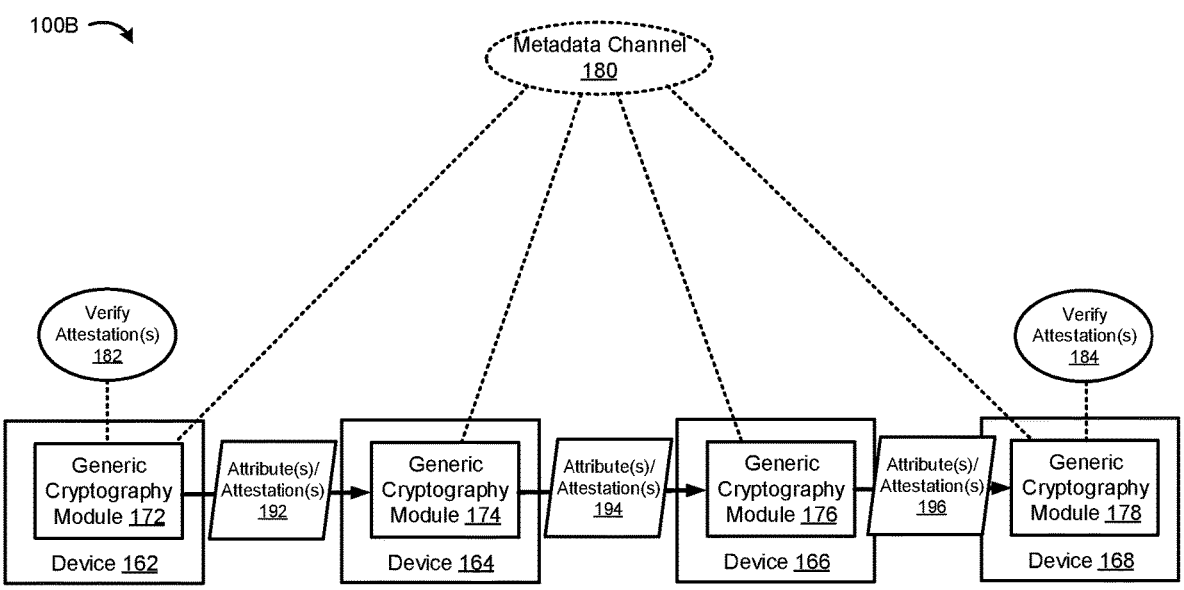
FIG. 1B is another illustration of example computing components related to multi-endpoint cryptographic orchestration, according to embodiments of the present disclosure.

FIG. 1B is another illustration 100B of example computing components related to attestation and enforcement of cryptographic requirements across multiple endpoints, according to embodiments of the present disclosure. Illustration 100B depicts an example of the use of a metadata channel for attestation and enforcement of cryptographic requirements in a multi-hop data path, such as in relation to generating a "chained" ensemble model.

Illustration 100B includes metadata channel 180 of FIG. 1A. Furthermore, illustration 100B includes a plurality of devices 162, 164, 166, and 168 (e.g., which may be edge devices similar to edge devices 112, 122, 132, and the like of FIG. 1A) comprising generic cryptography modules 172, 174, 176, and 178 (e.g., which may be similar to generic cryptography modules 114, 124, 134, and the like of FIG. 1A). According to certain embodiments, devices 162, 164, 166, and 168 are hops in a multi-hop data path involved in a multi-endpoint secure communication session, such as relating to generating an ensemble model.

Metadata channel 180, which is established between generic cryptography modules 172, 174, 176, and 178, allows generic cryptography modules 172, 174, 176, and 178 to securely specify cryptographic requirements related to the multi-endpoint secure communication session and to securely attest to compliance with such cryptographic requirements. Generic cryptography modules 172, 174, 176, and 178 may be configured to comply with cryptographic requirements sent via metadata channel 180 such that sending such cryptographic requirements via metadata channel 180 causes those cryptographic requirements to be enforced. Furthermore, as described in more detail below with respect to FIG. 4, attestations of compliance with cryptographic requirements that are sent via metadata channel 180 may also be written to a secure digital ledger in order to improve auditability and enforcement. For example, sending such an attestation via metadata channel 180 may automatically trigger creating a corresponding entry on a secure digital ledger.

In an example, devices 162, 164, 166, and/or 168 send requests to generic cryptography modules 172, 174, 176, and 178 to encrypt local data (e.g., local model parameters determined through a local model training process based on local training data), such as indicating that the requests relate to a privacy-preserving data aggregation process, indicating one or more attributes of devices 162, 164, 166, and 168, indicating one or more types of mathematical operations to be performed as part of aggregating data, and/or the like in the requests. Generic cryptography modules 172, 174, 176, and 178 dynamically select one or more cryptographic techniques such as involving confidential computing or homomorphic encryption algorithms based on attributes associated with the request, such as whether required specialized hardware is available, the operations to be performed, other computing resource and/or capability constraints, policy considerations, and/or the like. The involved generic cryptography modules communicate with each other to perform a cipher negotiation, such as via a secure channel established between them, to coordinate aspects of the one or more selected encryption techniques. While not required, some embodiments may involve utilizing metadata channel 180 for such secure communications related to a cipher negotiation. In some examples, the involved generic cryptography modules communicate requirements/constraints to a centralized component (e.g., one of the generic cryptography modules on the endpoints involved in the secure communication session or a different component) via metadata channel 180 and the centralized component dynamically selects one or more cryptographic techniques based on the information communicated via metadata channel 180.

The cipher negotiation may in some embodiments involve a secure computation process by which one or more encryption techniques are selected to service the requests from devices 162, 164, 166, and 168 based on encrypted attributes associated with the request. For example, an encrypted function may be generated that accepts encrypted inputs and produces a result that matches a result that would be produced by providing the unencrypted inputs to the unencrypted function. In some cases, more than one such encrypted function is used. The results of evaluating the encrypted function(s) may be used to select one or more cryptographic techniques that comply with the parameters. The unencrypted local parameters known to the involved generic cryptography modules may not be shared between separate networking environments, thus preserving the privacy of the parameters. Alternative techniques for performing a multi-endpoint cipher negotiation may alternatively or additionally be used. For example, some embodiments may involve the generic cryptography modules sharing local parameters with one another without using secure computation techniques, and/or may involve providing local parameters from the generic cryptography modules to a separate device (e.g., a trusted device) that determines which cryptographic techniques comply with all of the parameters.

In an example, after selecting a cryptographic technique based on a cipher negotiation, two or more of the involved generic cryptography modules may securely share one or more encryption keys that are used at the two or more involve generic cryptography modules to encrypt local data. In another example, two or more generic cryptography modules coordinate a multi-key encryption scheme with one another so that a key does not need to be shared between the generic cryptography modules.

After dynamically selecting one or more cryptographic requirements based on a cipher negotiation, metadata channel 180 may be used to communicate such cryptographic requirements between the generic cryptography modules. For example, the cryptographic requirements may indicate specific cryptographic techniques, specific types of cryptographic techniques, attributes of cryptographic techniques, and/or the like that will govern the cryptographic operations to be performed in association with the multi-endpoint secure communication session. In some embodiments, the multi-endpoint secure communication session is assigned a unique identifier, and this identifier is used to identify the session in all applicable communications sent via metadata channel 180 (and, in some embodiments, all entries corresponding to the session that are stored on secure digital ledger). In certain cases, indication(s) of cryptographic requirement(s) may be encrypted when sent via metadata channel 180, such as using public key(s) of recipient generic cryptography module(s). While a single metadata channel 180 is shown, alternative embodiments involve establishing separate metadata channels between different pairs of generic cryptography modules and/or for different multi-endpoint secure communication sessions.

Generic cryptography modules 172, 174, 176, and 178 may each encrypt the respective local data using the selected technique(s) and send the encrypted local data to the next hop, such as the next one of generic cryptography modules 172, 174, 176, and 178 in the chain. In alternative embodiments, generic cryptography modules 172, 174, 176, and 178, rather than performing encryption themselves, may provide information to one or more other components to perform the selected encryption technique(s). For example, different components on devices 162, 164, 166, and/or 168 or separate from these devices may perform encryption and/or may send encrypted data to the next hop or to another destination.

Generic cryptography modules 172, 174, 176, and 178 may send attestations via metadata channel 180 indicating that the applicable cryptographic requirement(s) for the communication session were complied with. For example, the attestations may be sent by populating one or more fields of a data structure in which the indication(s) of cryptographic requirement(s) were earlier sent via metadata channel 180. The attestations may be sent in association with the unique identifier of the multi-endpoint secure communication session. In some embodiments, each hop sends an attestation to the next hop in a chain.

Thus, attribute(s) and/or attestation(s) 192, 194, and 196 are sent by generic cryptography modules 172, 174, and 176 via metadata channel 180, such as each generic cryptography module sending its attributes and/or attestations to the next hop in the chain. The attribute(s) generally refer to local attributes of the devices that are to be used in the multi-endpoint cipher negotiation process (e.g., the attributes may include cryptographic requirements) and the attestation(s) generally refer to attestations that cryptographic requirements (e.g., specified by the individual endpoints and/or determined through the multi-endpoint cipher negotiation process) were complied with. While not shown, generic cryptography module 178 may also send attribute(s) and/or attestation(s) via metadata channel 180, such as to generic cryptography modules 172, 174, and/or 176.

In one embodiment, the first hop and the last hop are responsible for verifying the attestations of all hops along the path. Thus, in this case, at steps 182 and 184, generic cryptography modules 172 and 178 may verify the attestations of all of the hops (e.g., generic cryptography modules 172, 174, 176, and 178) in the multi-hop data path, or at least the attestations all of the hops other than the first and last hop (e.g., generic cryptography modules 174 and 176). Verification may be performed by receiving such attestations via metadata channel 180 and confirming that the attestations meet one or more conditions (e.g., corresponding to the correct format, having the right type of signature, and/or having one or more attributes that confirm authenticity of the attestations).

Thus, in the example depicted in illustration 100B, a data aggregation process may be performed through a multi-hop communication session in a privacy-preserving manner such that the hops are able to securely negotiate the cryptographic requirements of the communication session via metadata channel 180 and the hops are able to attest (and verify) via metadata channel 180 that the encrypted data used in the aggregation process (e.g., the encrypted data and the results of aggregation may be communicated separately from metadata channel 180) complies with the indicated and/or negotiated cryptographic requirements.

Figure 2:
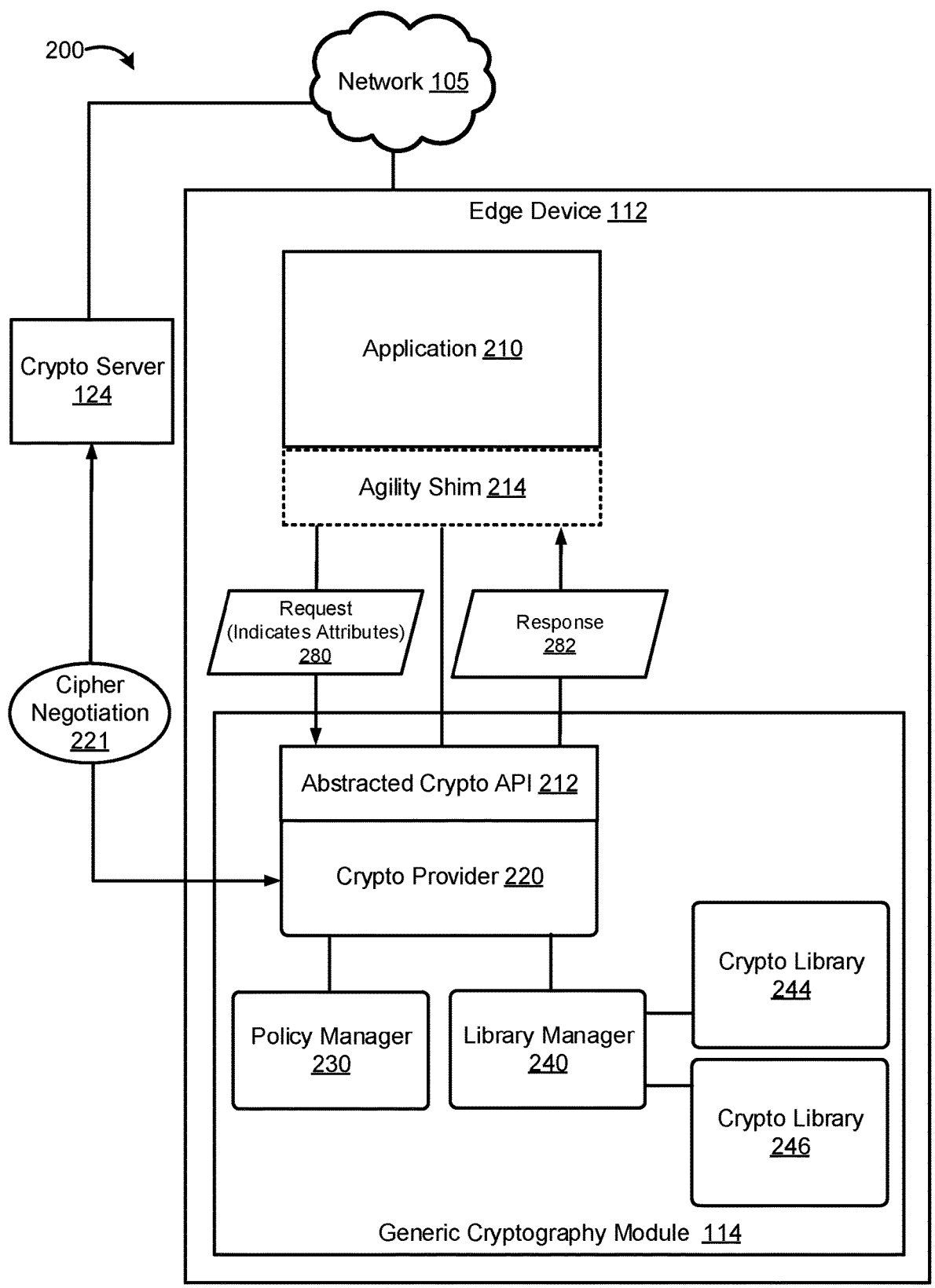
FIG. 2 is an illustration of an example related to dynamic cryptographic technique selection related to multi-endpoint cryptographic orchestration.

FIG. 2 is an illustration 200 of an example related to dynamic cryptographic technique selection related to multi-endpoint cryptographic orchestration, according to embodiments of the present disclosure. Illustration 200 includes network 105, edge device 112, generic cryptography module 114, and generic cryptography module 124 of FIG. 1A.

Edge device 112 may be a physical or virtual computing device, such as a server computer, that runs an application 210. In some embodiments, edge device 112 may be a virtual computing instance (VCI), such as a virtual machine (VM) or container that runs on a physical host computer that includes one or more processors and/or memory devices. It is noted that edge device 112 is included as an example computing device on which application 210 and/or associated components may be located, and other types of devices may also be used.

Application 210 generally represents a software application that requires cryptographic functionality. For example, application 210 may rely on cryptographic functionality to encrypt data that it transmits over a network (e.g., network 105), such as to aggregator device 150 of FIG. 1A, such as within a data aggregation process in which multiple aggregator devices are involved. In one example, application 210 performs operations related to federated learning, such as sending local model parameters (e.g., which may have been generated at edge device 112 and/or one or more other devices involved in a local model training process based on local training data) to one or more aggregator devices for aggregation with local parameters from other edge devices. While conventional techniques generally involve direct integration of cryptographic libraries with applications that rely on cryptographic functionality, such as for transmitting data associated with a federated learning process, techniques described herein involve abstracting cryptographic functionality away from such applications. As such, an abstracted crypto application programming interface (API) 212 is provided as a means of interaction between application 210 and a separate cryptographic agility system. Application 210 may call generic cryptographic functions of abstracted crypto API 212 in order to invoke particular cryptographic functionality, and the cryptographic agility system may select cryptographic techniques and perform cryptographic operations in response to the function invocations based on contextual information (e.g., including the hardware capabilities of one or more devices, types of mathematical operations to be performed, resource constraints, and/or the like). Thus, application 210 may be merely a consumer of cryptography provided by the separate cryptographic agility system, rather than implementing cryptography itself.

The cryptographic agility system includes abstracted crypto API 212 and, in certain embodiments, an optional agility shim 214, as well as crypto provider 220, policy manager 230, and library manager 240. In some embodiments, while depicted as separate components, the functionality associated with agility shim 214, abstracted crypto API 212, policy manager 230, and/or library manager 240 may be part of crypto provider 220 and/or may be implemented by more or fewer components. In certain embodiments, abstracted crypto API 212 and/or agility shim 214 are part of application 210. In alternative embodiments, abstracted crypto API 212 and/or agility shim 214 may be located on a separate device from edge device 112, such as on the same device as generic cryptography module 114 or a different computing device.

Agility shim 214 generally intercepts API calls (e.g., calls to functions of abstracted crypto API 212) and redirects them to crypto provider 220 via abstracted crypto API 212. Shims generally allow new software components to be integrated with existing software components by intercepting, modifying, and/or redirecting communications. As such, agility shim 214 allows application 210 to interact with crypto provider 220 even though application 210 may have no knowledge of crypto provider 220. For instance, application 210 may make generic cryptographic function calls (e.g., requesting that an item of data be encrypted), and these generic function calls may be intercepted by agility shim 214 (e.g., if such a shim is needed) and redirected to crypto provider 220 via the abstracted crypto API 212 exposed by crypto provider 220.

It is noted that while embodiments of the present disclosure are depicted on edge device 112, alternative embodiments may involve various components being located on more or fewer computing devices. In some cases, aspects of the cryptographic agility system may be implemented in a distributed fashion across a plurality of computing devices. In certain embodiments, said components may be located on a single computing device.

In certain embodiments, generic cryptography module 114 comprises a physical or virtual computing device, such as a server computer, on which components of the cryptographic agility system, such as crypto provider 220, policy manager 230, and/or library manager 240, reside. For example, generic cryptography module 214 may represent a VCI or a physical computing device. Generic cryptography module 214 may be connected to network 105 and/or one or more additional networks (e.g., networking environment 110 of FIG. 1A).

Crypto provider 220 generally performs operations related to dynamically selecting cryptographic techniques (e.g., based on contextual information related to requests for cryptographic operations, such as whether specialized hardware is available, the types of mathematical operations to be performed at one or more aggregator devices in a federated learning process, and/or the like), performing the requested cryptographic operation(s) according to the selected technique(s), and providing results of the operation(s) to the requesting components. Cryptographic techniques may include the use of cryptographic algorithms (e.g., included in one or more libraries), and/or specific configurations of cryptographic algorithms, as described herein. In some embodiments, the cryptographic agility system is located on the same device as application 210, while in other embodiments the cryptographic agility system is located on a separate device, such as on a server that is accessible over a network. Crypto provider 220's selection of cryptographic techniques may be based on a cipher negotiation 221 between crypto provider 220 and one or more corresponding crypto providers on one or more other generic cryptography modules, such as generic cryptography module 124 (e.g., which may be associated with a separate edge device in a separate network, such as edge device 122 of FIG. 1A).

In certain aspects, crypto provider 220 has two major subsystems, policy manager 230 and library manager 240. Policy manager 230 performs operations related to cryptographic policies, such as receiving policies defined by users such as security administrators and storing information related to the policies, such as in a policy table. According to certain embodiments, a centralized policy control server may orchestrate policy across a plurality of generic cryptography modules, such as including generic cryptography module 114. For example, an administrator or other user may configure one or more policies at a centralized policy control server, and the one or more policies may be distributed to a plurality of generic cryptography modules for storage by corresponding policy managers, such as including policy manager 230. In an example, a policy is based on one or more of an organizational context and a user context related to a cryptographic request. In some embodiments, a policy may map a cryptographic request and its associated context information to attributes of cryptographic techniques, such as a particular cryptographic technique in a particular cryptographic library and a particular set of parameters for configuring the particular cryptographic technique.

Organizational context may involve geographic region (e.g., country, state, city and/or other region), industry mandates (e.g., security requirements of a particular industry, such as related to storage and transmission of medical records), government mandates (e.g., laws and regulations imposed by governmental entities, such as including security requirements), and the like. For instance, a policy may indicate that if a cryptographic request is received in relation to a device associated with a particular geographic region, associated with a particular industry, and/or within the jurisdiction of a particular governmental entity, then crypto provider 220 must select a cryptographic technique that meets one or more conditions (e.g., having a particular security rating, being configured to protect against particular types of threats, and/or involving confidential computing or homomorphic encryption) in order to comply with relevant laws, regulations, preferences, or mandates.

User context may involve user identity (e.g., a user identifier or category, which may be associated with particular privileges), data characteristics (e.g., whether the data is sensitive, classified, or the like), application characteristics (e.g., whether the application is a business application, an entertainment application, or the like), platform characteristics (e.g., details of an operating system), device characteristics (e.g., hardware configurations and capabilities of the device, resource availability information, and the like), device location (e.g., geographic location information, such as based on a satellite positioning system associated with the device), networking environment (e.g., a type of network to which the device is connected, such as a satellite or land-based network connection), and/or the like. For example, a policy may indicate that if a cryptographic request is received with respect to a particular category of user (e.g., administrators, general users, or the like), relating to a particular type of data (e.g., tagged as sensitive or meeting characteristics associated with sensitivity, such as being financial or medical data, or being associated with privacy-preserving data aggregation), associated with a particular application or type of application, associated with a particular platform (e.g., operating system), with respect to a device with particular capabilities or other attributes (e.g., having a certain amount of processing or memory resources, having an accelerator, having one or more particular types of processors, and/or the like), with respect to a device in a particular location (e.g., geographic location) or type of networking environment (e.g., cellular network, satellite-based network, land network, or the like), and/or that is to be transmitted to a device having one or more particular characteristics (e.g., being untrusted, being located in a public networking environment, being located in a particular geographic region, having specialized hardware, and/or the like), then crypto provider 220 should select a cryptographic technique that meets one or more conditions.

In one example, a policy indicates that if a request relates to encrypting data that is to be transmitted to a device that is untrusted for one or more reasons for computation to be performed on the data, then a confidential computing or homomorphic encryption technique should be selected. In certain embodiments, a policy may specify that, unless otherwise required (e.g., because of another policy, such as related to security level), when homomorphic encryption is used, a homomorphic encryption technique that supports the required mathematical operations while having the lowest resource utilization requirements of all such homomorphic encryption techniques is to be selected. In some cases, a policy may relate to resource constraints (e.g., based on available processing, memory, network, physical storage, accelerator, entropy source, or battery resources), such as specifying that cryptographic techniques must be selected based on resource availability (e.g., how much of a device's processing and/or memory resources are currently utilized, how much latency is present on a network, and the like) and/or capabilities (e.g., whether a device is associated with an accelerator) associated with devices and/or networks, while in other embodiments crypto provider 220 selects cryptographic techniques based on resource constraints and/or supported mathematical operations independently of policy manager 230 (e.g., for all applicable cryptographic requests regardless of whether any policies are in place). For example, policies may only relate to security levels of cryptographic techniques, such as requiring the use of cryptographic techniques associated with particular security ratings when certain characteristics are indicated in contextual information related to a cryptographic request, and resource constraints may be considered separately from policies. In certain embodiments, a policy may simply specify an allowed list of ciphers or an allowed list of cryptographic technique characteristics.

Attributes, such as policies, organizational context information, user context information, and/or the like may include sensitive data. Thus, certain techniques for cipher negotiation 221 between endpoints may allow such sensitive data to be taken into account in a multi-endpoint cipher negotiation without disclosing such sensitive data between endpoints or their networking environments, such as using secure multiparty computation, confidential computing, homomorphic encryption, a trusted third party, and/or the like.

In one example, as part of cipher negotiation 221 between the involved endpoints, once all cryptographic techniques meeting the security requirements, hardware requirements, and/or mathematical operation requirements for a cryptographic request are identified (e.g., based on policies or otherwise), a cryptographic technique is selected from these compliant cryptographic techniques based on resource constraints.

It is noted that resource constraints and/or capabilities may include a variety of different types of information, such as processor availability and/or capabilities (e.g., clock rate, number of cores, instruction-level features such as single instruction multiple data (SIMD) instructions, types of processors, inclusion of secure enclaves, and/or the like) memory availability and/or capabilities (e.g., memory size and performance), accelerator capabilities (e.g., hardware-based cryptographic accelerator units available for use with the device), battery capabilities (e.g., lifetime, current power remaining, and/or the like), information about entropy (e.g., how much entropy is available for random numbers, the source of entropy such as an OS, hardware module, CPU platform, or the like, whether available entropy sources are federal information processing standards (FIPS) compliant, and/or the like), network connectivity information (e.g., bandwidth, loss metrics for the channel, congestion, latency, and/or the like), information about the device's physical exposure to potential side-channel attacks and/or ease of side channel analysis, and/or the like. Thus, any of these types of data points may be gathered from devices and/or networks, and may be used in selecting cryptographic techniques (e.g., based on policies and/or tags related to these data points associated with cryptographic techniques).

A policy table may store information related to policies. In some embodiments, a policy table maps various contextual conditions (e.g., relating to organizational context and/or user context) to cryptographic technique characteristics (e.g., whether techniques are privacy-preserving, homomorphic, involve confidential computing, require specialized hardware, support certain mathematical operations, have certain security ratings, protect against certain threats, have certain resource utilization ratings, and the like). For example, a contextual condition may be the use of a certain type of application, the requirement that privacy be preserved during computation, the requirement of certain mathematical operations to be performed on encrypted data, a certain type of data, or a particular geographic location. A cryptographic technique characteristic may be, for example, whether the cryptographic technique is homomorphic, whether the cryptographic technique involves confidential computing and/or requires certain specialized hardware, supported mathematical operations, a security rating (e.g., 0-10), whether the cryptographic technique is quantum-safe, what level of resource requirements the cryptographic technique has for a particular type of resource (e.g., memory, processor, or network resources), or the like. Thus, when cryptographic requests are received, a policy table may be used to determine whether the cryptographic requests are associated with any characteristics included in policies and, if so, what cryptographic technique characteristics are required by the policies for servicing the requests.

Library manager 240 generally manages cryptographic libraries containing cryptographic algorithms and/or techniques. For example crypto libraries 244 and 246 each include various cryptographic algorithms and/or techniques, each of which may include configurable parameters, such as key size, choice of elliptic curve, algorithm sizing parameters, and the like, and characteristics such as ciphertext size. For instance, cryptographic techniques (e.g., algorithms and/or specific configurations of algorithms, and/or confidential computing techniques) may be registered with library manager 240 along with information indicating characteristics of the cryptographic techniques. Examples of algorithms include the Paillier cryptosystem, the Boneh-Goh-Nissim cryptosystem, the Rivest-Shamir-Adleman (RSA) cryptosystem, the Gentry cryptosystem(s), the Brakerski-Gentry-Vaikuntanathan (BGV) cryptosystem(s), the Cheon, Kim, Kim and Song (CKKS) cyrptosystem(s), the Clear and McGoldrick multi-key homomorphic cryptosystem, data encryption standard (DES), triple DES, advanced encryption standard (AES), Diffie-Hellman (DH) encryption, Elliptic Curve DH (ECDH) encryption, digital signatures such as Digital Signature Algorithm (DSA) and Elliptic Curve DSA (ECDSA), cryptographic hash functions such as Secure Hash Algorithm 2 or 3 (SHA-2 or SHA-3), and others. There are many other types of encryption algorithms, including homomorphic and non-homomorphic encryption algorithms, and the algorithms listed herein are included as examples. Some algorithms may, for example, involve symmetric key encryption or asymmetric key encryption, digital signatures or cryptographic hash functions, and/or the like. A configuration of an algorithm may include values for one or more configurable parameters of the algorithm, such as key size, size of lattice, which elliptic curve is utilized, number of bits of security, whether accelerators are used, ciphertext size, and/or the like. Cryptographic techniques may also involve confidential computing techniques, which may rely on the use of specialized hardware, such as Intel® Software Guard Extensions (SGX), Project Amber, Intel® Trust Domain Extensions (TDX), Arm® TrustZone®, and/or the like. A characteristic of a cryptographic technique may be, for example, whether the cryptographic technique is privacy-preserving, whether the cryptographic technique involves confidential computing, whether the cryptographic technique is homomorphic, what types of specialized hardware are required for the cryptographic technique, supported mathematical operations, whether the technique is Turing complete (e.g., supports all types of mathematical operations, such as a fully homomorphic encryption scheme), a security rating, a resource requirement rating, whether the technique requires an accelerator, whether the technique is quantum-safe, or the like. A cryptographic technique may include more than one cryptographic algorithm and/or configuration. In an example, each cryptographic technique is tagged (e.g., by an administrator) based on characteristics of the technique, such as with an indication of whether the cryptographic technique is privacy-preserving, whether the cryptographic technique is homomorphic, what types of specialized hardware are required for the cryptographic technique, an indication of supported mathematical operations, a security rating, an indication of threats protected against by the technique, indications of the resource requirements of the technique, and/or the like.

Information related to cryptographic techniques registered with library manager 240 may be stored in an available algorithm/configuration table. For instance, an available algorithm/configuration table may store identifying information of each available cryptographic technique (e.g., an identifier of a library, an identifier of an algorithm or technique in the library, and/or one or more configuration values for the algorithm) associated with tags indicating characteristics of the technique. It is noted that policies and tags are examples of how cryptographic techniques may be associated with indications of characteristics, and alternative implementations are possible. For instance, rather than associating individual cryptographic techniques with tags, alternative embodiments may involve associating higher-level types of cryptographic techniques with tags, and associating individual cryptographic techniques with indications of types. For example, a higher-level type of cryptographic technique may be "homomorphic encryption algorithms configured to support addition." Thus, if tags are associated with this type (e.g., including supported mathematical operations, security ratings, recourse requirement ratings, and the like), any specific cryptographic techniques of this type (being homomorphic encryption algorithms, and being configured to support addition) will be considered to be associated with these tags. In another example, fuzzy logic and/or machine learning techniques may be employed in the selection and/or negotiation of cryptographic techniques, such as based on historical cryptographic data indicating which cryptographic techniques were utilized for cryptographic requests having particular characteristics. In some embodiments, tags may be associated with specific configurations of cryptographic algorithms, such as assigning a security rating to a particular set of configuration parameters for a particular cryptographic algorithm or type of algorithm.

Tags associated with cryptographic techniques may be updated as appropriate over time, such as based on input from a user (e.g., an administrator, security operations professional, and/or the like). For example, a user may provide input upgrading or downgrading a security rating for a particular cryptographic technique, type of cryptographic technique, or configuration of a cryptographic technique (e.g., from 10 out of 10 to 8 out of 10), such as based on changed understandings of vulnerabilities or strengths of particular techniques.

In some cases, rather than directly selecting specific cryptographic techniques as a result of cipher negotiation 221, crypto provider 220 may select types of cryptographic techniques or attributes of cryptographic techniques that are needed in order to comply with preferences and/or other attributes of all involved endpoints. Thus, cryptographic requirements for a multi-endpoint secure communication session that are determined using techniques described herein may comprise specific cryptographic techniques, specific types of cryptographic techniques, specific attributes of cryptographic techniques, and/or the like.

By allowing cryptographic techniques and libraries, including new homomorphic encryption techniques that may become available due to the ongoing research into such techniques, to be registered and deregistered with library manager 240 on an ongoing basis, and to be associated with metadata such as tags that can be dynamically updated, embodiments of the present disclosure allow the pool of possible cryptographic techniques to be continuously updated to meet new conditions and threats. For example, as new libraries and/or techniques are developed, these libraries and/or techniques may be added to library manager 240, and such cryptographic techniques may be used by crypto provider 220 in servicing requests from application 210 without application 210 having any awareness of the new libraries and/or techniques. Similarly, by managing policies and libraries separately, policies may be defined in an abstract manner (e.g., based on characteristics of requests and cryptographic techniques) such that policies may be satisfied through the selection of new cryptographic techniques that were not known at the time of policy creation.

In one particular example, a new cryptographic technique is tagged as being fully homomorphic (e.g., Turing complete), meaning that the cryptographic technique was developed to support all types of mathematical operations in a homomorphic manner. For instance, the new cryptographic technique may have a high security rating (e.g., 10 out of 10) as well as high resource requirements. The new cryptographic technique is registered with library manager 240, and information about the new cryptographic technique and its characteristics is stored in an available algorithm/configuration table. Thus, the new cryptographic technique is available to be selected by crypto provider 220 for servicing cryptographic requests from application 210.

Continuing with the example, a policy at one of the edge devices involved in an aggregation process states that cryptographic requests relating to data that is to be sent to an aggregator device for aggregation as part of a federated learning process is to be encrypted using a fully homomorphic technique if such a technique is available, unless device and/or network resource constraints prohibit the use of such a technique. Thus, when application 210 submits a cryptographic request 280 (e.g., via a call to a generic cryptographic function provided by abstracted crypto API 212) to encrypt an item of data that is to be sent to an aggregator device for aggregation as part of a federated learning process, crypto provider 220 determines based on information stored in the policy table (and/or based on cipher negotiation 221) that a fully homomorphic cryptographic technique is to be used if possible. Crypto provider 220 determines based on information in the available algorithm/configuration table that the new cryptographic technique is fully homomorphic. Crypto provider 220 may also analyze resource constraints related to the cryptographic request 280 (e.g., as part of cipher negotiation 221) to determine if the new cryptographic technique can be performed. If crypto provider 220 determines that the device and/or network associated with application 210 can support the new cryptographic technique (e.g., based on available resources, which may be considered as part of cipher negotiation 221), then crypto provider 220 selects the new cryptographic technique for servicing the cryptographic request 280, and provides a response 282 to application 210 (e.g., via agility shim 214) accordingly. However, if crypto provider 220 determines that the device and/or network associated with application 210 cannot support the new cryptographic technique (e.g., based on available resources), then crypto provider 220 selects a different cryptographic technique for servicing the cryptographic request 280, such as a different homomorphic encryption technique that supports the mathematical operations indicated in request 280 and that otherwise complies with the resource constraints of the devices and/or networks, and provides a response 282 to application 210 (e.g., via agility shim 214) accordingly. In some embodiments, the request indicates that multiple aggregator devices are involved in the aggregation process, and indicates attributes of each aggregator device, such as operations to be performed at each aggregator device and resource constraints of each aggregator device. In such as case, crypto provider 220 may select a different cryptographic technique for each aggregator device, and (as needed) information related to one or more of the selected cryptographic techniques may be sent to a confidential computing component of a cryptographic translator server for use in translating between the selected cryptographic techniques.

In some cases, the response sent from crypto provider 220 to application 210 includes data encrypted using the selected technique. In other cases, the response includes information related to performing the selected technique(s) to encrypt the data, and the encryption is performed on the device from which the request was sent. In still other cases, one or more other components and/or devices may be involved in performing the encryption according to the technique(s) selected by crypto provider 220.

Generic cryptography module 124 may also determine which cryptographic technique(s) to use based on cipher negotiation 221. For example, generic cryptography modules 114 and 124 (and, in some embodiments, one or more other generic cryptography modules) may negotiate a common one or more cryptographic techniques to utilize for related requests through cipher negotiation 221.

In some cases, more than one cryptographic technique may be selected for servicing a given cryptographic request, even for a single aggregator device. For instance, an item of data may first be encrypted using a first technique (e.g., that satisfies one or more first conditions related to policy and/or resource considerations) and then the encrypted data may be encrypted again using a second technique (e.g., that satisfies one or more second conditions related to policy and/or resource considerations). For example, a dual or multi-encryption scheme such as composite encryption or hybrid encryption may be employed for servicing a single cryptographic request. In some embodiments, one or more homomorphic encryption techniques and one or more confidential computing techniques may be selected to service a single cryptographic request.

There may be cases where there is no available cryptographic technique that complies with all policies, privacy-preservation constraints, device constraints, resource constraints, and operation constraints and so trade-offs may be made (e.g., in accordance with policies and/or logic governing such cases), such as selecting a cryptographic technique that is not fully compliant with one or more of these factors (e.g., if certain factors are non-mandatory), or certain cryptographic requests may be declined as impossible under the circumstances. For example, cipher negotiation 221 may produce a result indicating that no cryptographic techniques that comply with all parameters are available.

Figure 3:
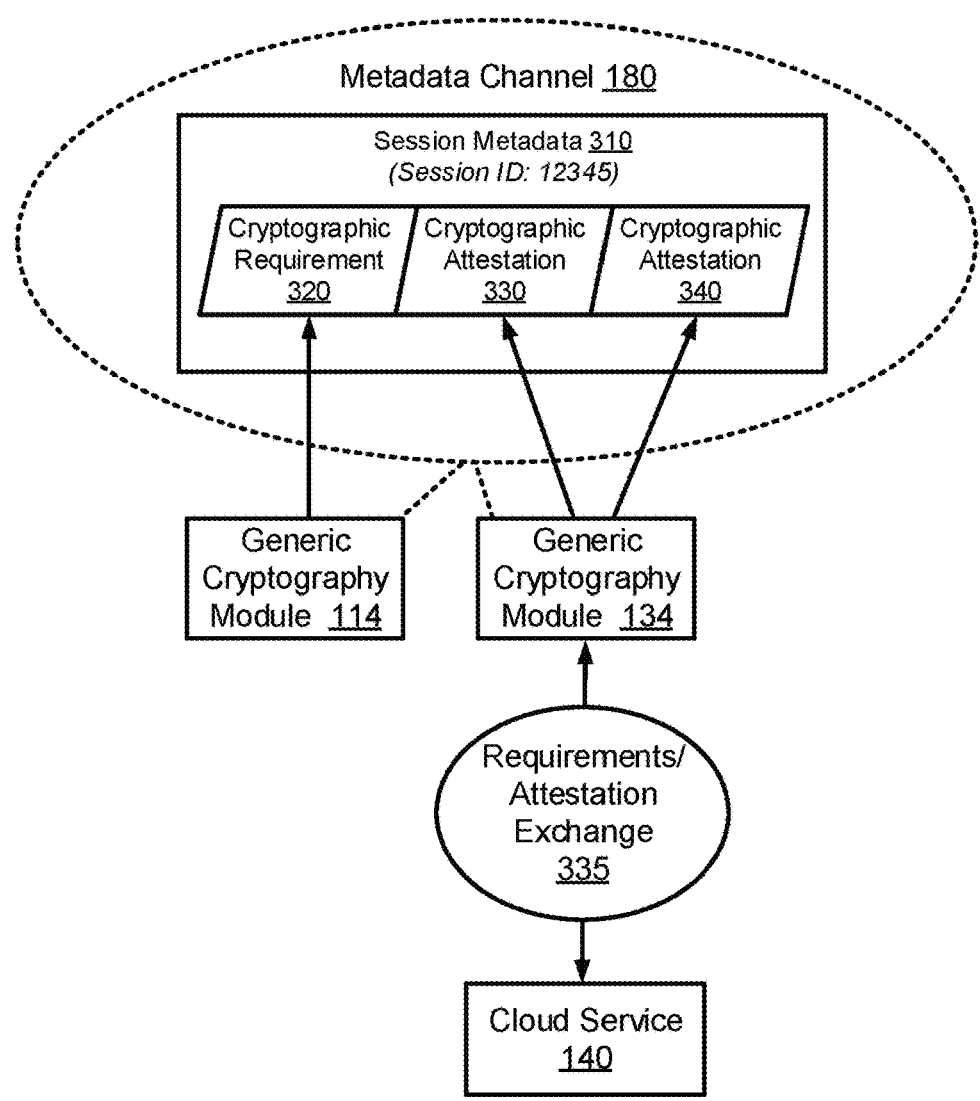
FIG. 3 is an illustration of an example related to a metadata channel for multi-endpoint cryptographic orchestration.

FIG. 3 is an illustration 300 of an example related to a metadata channel for multi-endpoint cryptographic orchestration. Illustration 300 includes generic cryptography modules 114 and 134, cloud service 140, and metadata channel 180 of FIG. 1A.

Metadata channel 180 is established between generic cryptography module 114 and generic cryptography module 134 (and, in some embodiments, one or more additional generic cryptography modules and/or other endpoints) Generic cryptography module 114 sends a cryptographic requirement 320 via metadata channel 180 to generic cryptography module 134. For example, generic cryptography module 114 may send session metadata 310 via metadata channel 180, and session metadata 310 may be a data structure that includes a unique identifier of a multi-endpoint secure communication session (e.g., session ID 12345), cryptographic requirement 320, and one or more fields that can be populated by one or more other endpoints with attestations of compliance with cryptographic requirement 320. It is noted that this data structure is included as an example implementation, and other implementations are possible.

Cryptographic requirement 320 generally indicates a requirement that must be met by all cryptographic operations performed by endpoints associated with the unique session identifier and that receive session metadata 310. For example, cryptographic requirement 320 may indicate that fully homomorphic encryption must be used as part of a particular federated learning process.

Generic cryptography modules 114 and 134 may perform one or more cryptographic operations based on cryptographic requirement 320, such as encrypting data using fully homomorphic encryption. Generic cryptography module 134 sends a cryptographic attestation 330 via metadata channel 180 indicating that one or more cryptographic operations performed by generic cryptography module 134 comply with cryptographic requirement 320. While not shown, generic cryptography module 114 may also send a similar attestation via metadata channel 180 about one or more cryptographic operations performed by generic cryptography module 114.

Furthermore, generic cryptography module 134 communicates with cloud service 140 via an exchange 335 by which generic cryptography module 134 communicates cryptographic requirement 320 to cloud service 140 and cloud service 140 provides some sort of proof or attestation to generic cryptography module 134 that it has complied with cryptographic requirement 320 when performing one or more cryptographic operations related to the multi-endpoint secure communication session. Generic cryptography module 134, upon receiving such a proof or attestation, and/or upon performing an independent confirmation that cloud service 140 has complied with cryptographic requirement 320 (e.g., by evaluating information received from cloud service 140), sends a cryptographic attestation 340 via metadata channel 180 attesting that cloud service 140 complied with cryptographic requirement 320 when performing one or more cryptographic operations. For example, cryptographic attestations 330 may be sent by generic cryptography module 134 by populating one or more fields in session metadata 310 and sending session metadata 310 back to generic cryptography module 114 (and/or one or more additional endpoints).

In some embodiments, metadata sent via metadata channel 180 is encrypted, such as using public keys of specific endpoints to which such metadata is directed. For example, generic cryptography module 114 may encrypt session metadata 310, or at least cryptographic requirement 320, using a public key of generic cryptography module 134, and generic cryptography module 134 may decrypt this data.

Cryptographic attestations 330 and/or 340 may comprise one or more digital signatures of generic cryptography module 134 and/or one or more other signing authorities (e.g., that evaluate information related to cryptographic operations that were performed in order to confirm that such operations complied with cryptographic requirement 320), may include one or more types of proof (e.g., zero knowledge proof, one or more encryption keys, and/or other types of information), and/or otherwise attest to compliance with cryptographic requirement 320. Cryptographic attestations 330 and/or 340 may also indicate which specific cryptographic operations were performed, and which cryptographic techniques were used to perform the operations. Generic cryptography module 114 and/or one or more other endpoints may receive cryptographic attestations 330 and/or 340 via metadata channel 310. For example, generic cryptography module 114 may send specific cryptographic requirements to specific generic cryptography modules that must comply with those specific cryptographic requirements, and may encrypt such transmissions using public keys of the intended recipients. The recipients may then similarly encrypt cryptographic attestations that they send via metadata channel 180, such as using a public key of generic cryptography module 114 and/or one or more other endpoints. It is noted that such encryption of metadata is included as an example, and other implementations are possible.

In general, metadata channel 180 may allow for communication of cryptographic requirements and attestation to compliance with such cryptographic requirements across multiple hops of a multi-endpoint secure communication session. Furthermore, generic cryptography modules may be configured to only perform cryptographic operations that comply with applicable cryptographic requirements that are communicated via metadata channel 180, thus allowing metadata channel 180 to enforce compliance with applicable cryptographic requirements.

Figure 4:
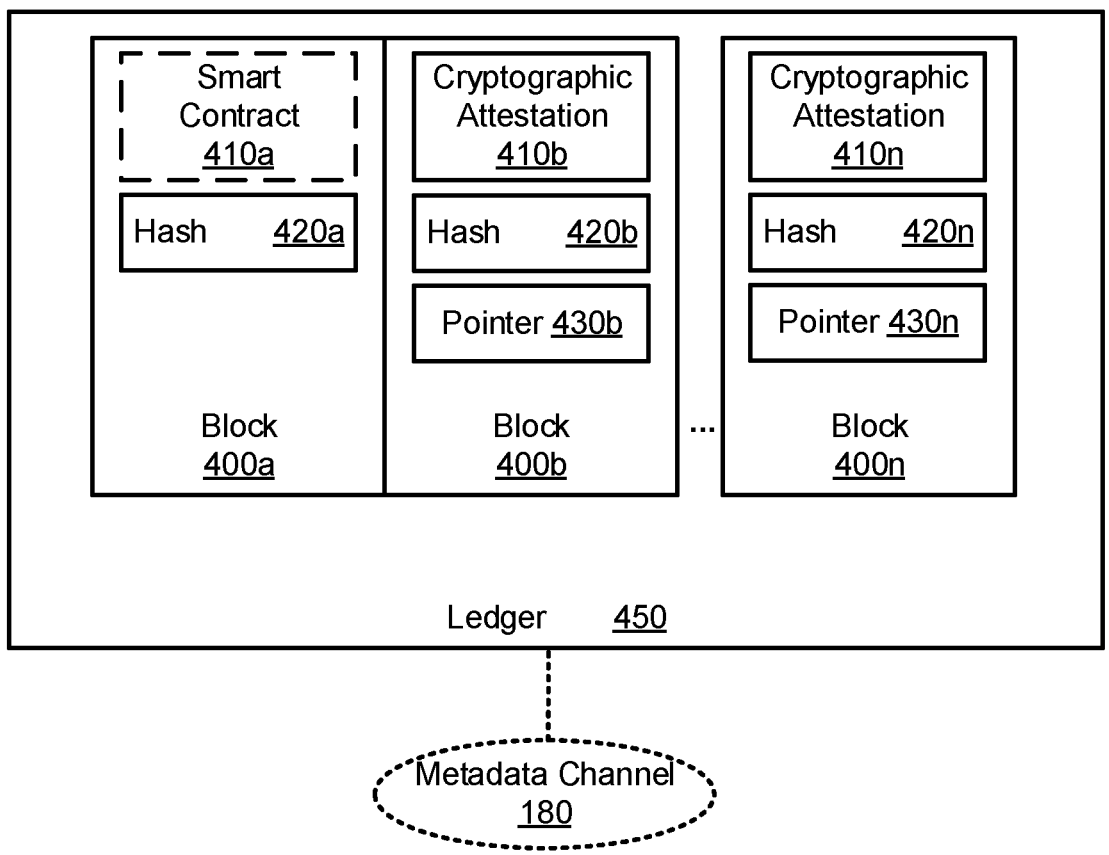
FIG. 4 depicts an example of a secure digital ledger related to multi-endpoint cryptographic orchestration.

FIG. 4 depicts an example of a secure digital ledger 450 related to multi-endpoint cryptographic orchestration. FIG. 4 includes metadata channel 180 of FIG. 1A.

Ledger 450 comprises a series of blocks 400*a-n*. In one example, ledger 450 is a hash chain, such as a block chain.

Hash chains are data structures that record data in a fashion analogous to a chain. Each update to the chain creates a new block containing the data and each block is linked to the previous block by a cryptographic function. Blocks are generally appended to the end of the chain and, once in the chain, resist modification so that the cryptographic links in the chain are preserved. Entities (e.g., applications) that receive data from blocks of the chain may check the cryptographic links to test the validity of the chain. Any attempt to modify a block is detected and subject to remedial or other action. Hash chains are generally managed by peer-to-peer networks, which collectively adhere to an established protocol for validating each new block and are designed to be inherently resistant to modification of data. Once recorded, the data in any given block cannot be modified without the alteration of subsequent blocks and the involvement of the network. Thus, if records of operations related to cryptographic agility are written to such a secure digital ledger, these records can be trusted to be accurate, and can be relied upon for auditing purposes.

More generally, ledger 450 is a modification-resistant, auditable data store. It is noted that ledger 450 may be independent of any particular computing device, and copies of all or portions of ledger 450 may exist on a plurality of devices. Block 400*a* contains smart contract 410*a* and a hash 420*a* (e.g., a hash of smart contract 410*a*). Smart contract 410*a* is an example embodiment of an auditing component that may perform auditing functions for data stored on ledger 450.

A "smart contract" generally refers to a self-executing program that automatically performs operations and maintains state information. Smart contracts are computerized transaction protocols that execute operations (e.g., auditing operations) through cryptographic code, such as in response to block chain entries that trigger automated actions. When stored on a hash chain, smart contracts may be used to automatically analyze records of operations related to cryptographic agility according to particular conditions (e.g., rules and/or patterns related to security and/or compliance with standards) while providing complete visibility and preventing modification to the conditions (e.g., due to the transparent and immutable properties of hash chains).

In alternative embodiments, an auditing component is separate from ledger 450.

Blocks 400*b-n* each comprise a cryptographic attestation 410*b-n*, a hash 420*b-n* (e.g., hashes of cryptographic attestations 410*b-n*), and a pointer 430*b-n* to the previous block. In another embodiment (not depicted), block 400*a* may have a pointer with a null value indicating that it is the first block in the hash chain.

Hashes 420 are generally determined (e.g., by a management component of ledger 450) at the time each respective block 400 is added to the chain by applying a hash function to the payload 410 (e.g., smart contract 410*a* and cryptographic attestations 410*b-n*) stored in the block 400. In some embodiments, hashes 420 may serve as identifiers for blocks 400. The integrity of ledger 450 may be verified, such as for auditing purposes, by traversing the chain using pointers 430 and applying the hash function to the payload 410 of each block 400 and comparing the result to the corresponding hash 420.

Each block 400 may be added to ledger 450 (e.g., via metadata channel 180, at the request of a crypto provider, and/or one or more other entities) according to an established protocol for appending new blocks to the chain, such as a consensus protocol or a trusted authority protocol, as known in the art. In certain embodiments, "miners" may be employed to ensure the integrity of modifications to the chain, as known in the art.

For example, one or more crypto providers sending cryptographic attestations via metadata channel 180 (e.g., as described above with respect to FIG. 3) may cause cryptographic attestations 410*b-n* to be sent to ledger 450 for storage on the chain, and blocks 400*b-n* may be appended to the chain to store the attestations. In certain embodiments, ledger 450 is configured to receive all metadata that is sent via metadata channel 180 and store such metadata in one or more blocks 400 on ledger 450.

A given cryptographic attestation, such as cryptographic attestation 210*b*, may represent a record that one or more components complied with one or more cryptographic requirements when performing one or more operations related to cryptographic agility, such as selecting or performing a cryptographic technique for servicing a cryptographic request. A cryptographic attestation may include, for example, a unique identifier of a multi-endpoint secure communication session, an indication of one or more cryptographic requirements for the multi-endpoint secure communication session, an indication of one or more cryptographic operations, an identifier of a device or component, and an attestation that the device or component complied with the one or more cryptographic requirements when performing the one or more cryptographic operations. In some cases, a cryptographic attestation further comprises some type of proof of compliance, such as a digital signature, an encryption key, verifiable information about a confidential computing environment, and/or the like.

Ledger 450 may allow for auditing of operations related to cryptographic agility. In some embodiments ledger 450 is publicly accessible, while in other embodiments ledger 450 is private. For example, access to ledger 450 may be allowed only to entities authorized for auditing purposes. In certain embodiments, ledger 450 is private, and auditing is performed by one or more entities with access to ledger 450 (e.g., smart contract 410*a*), and results of audits (e.g., indicating compliance or noncompliance with one or more standards and/or requirements) are provided to external entities upon request (e.g., without providing the underlying payloads 410 to the external entities). Even if ledger 450 is not public, external entities can trust the results of audits performed on ledger 450 due to the immutable and secure nature of ledger 450 (e.g., if the code of the auditing component such as a smart contract and the cryptographic agility system can be attested to in a private ledger).

It is noted that techniques described herein may utilize a newly created ledger or a previously-existing ledger. For example, in some embodiments, records of operations related to cryptographic agility may be written to one or more portions of an existing hash chain.

Furthermore, in some embodiments, attestations may be sent via metadata channel 180 and written to ledger 450 before execution of an operation in order to register the intent of the system. For example, this may be used to prevent errors at runtime. An auditing component may recognize an intent from a pre-execution record written to the ledger, and may disapprove of operations determined to be inconsistent with one or more policies (e.g., based on an inconsistency or other issue with the attestation). For example, the auditing component could prevent the operation from occurring or otherwise generate an alert related to the operation in the event that an irregularity is detected based on a pre-execution record. Furthermore, in some embodiments the cryptographic agility system verifies the presence of a pre-execution record on the ledger prior to performing the operation indicated in the record, such as to ensure that a malicious actor did not block the record from being written to the ledger. Thus, techniques described herein may allow for error checking and code compliance policies to be implemented.

Figure 5:
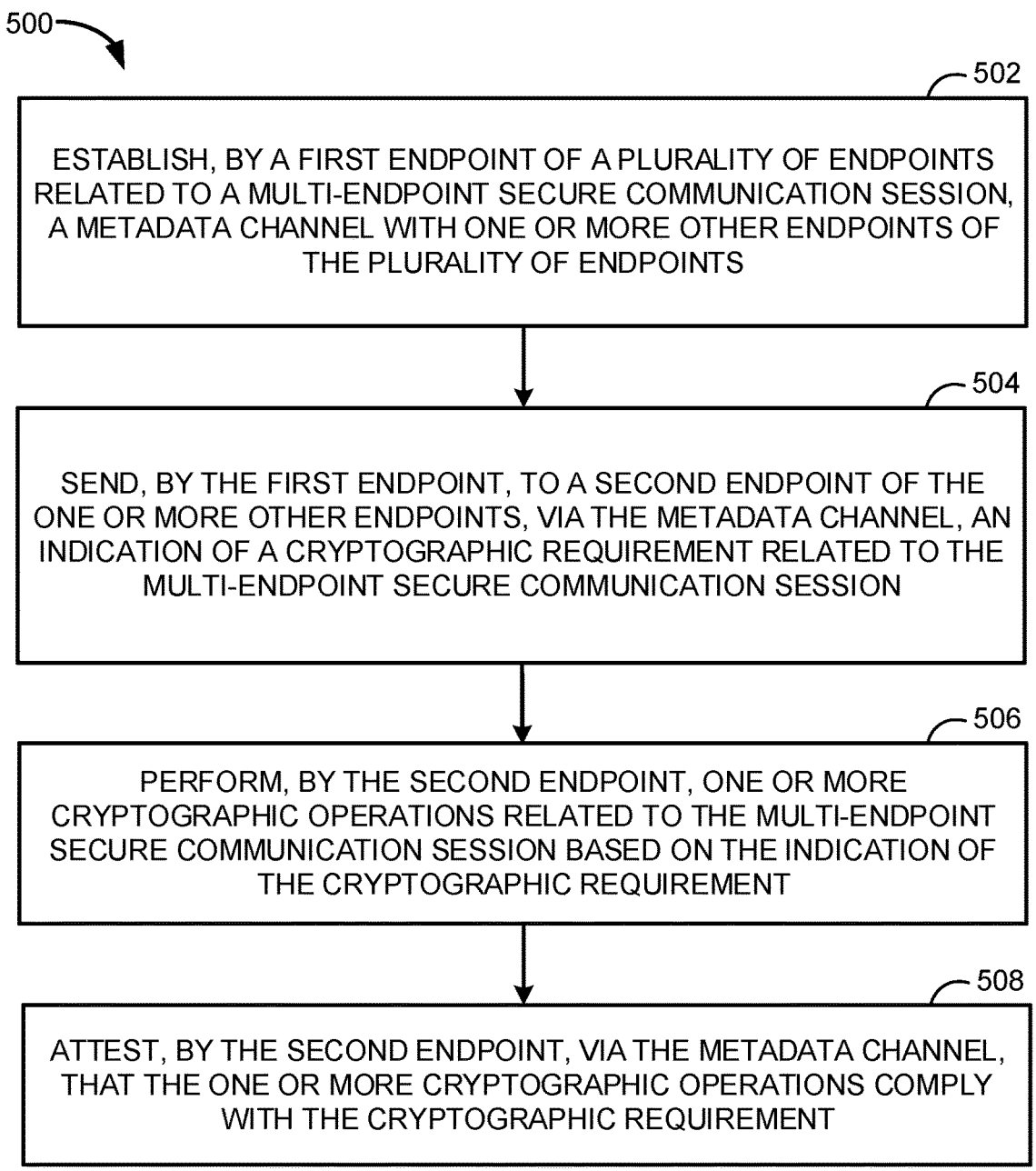
FIG. 5 depicts example operations for multi-endpoint cryptographic orchestration, according to embodiments of the present disclosure.

FIG. 5 depicts example operations 500 related to multi-endpoint cryptographic orchestration according to embodiments of the present disclosure. For example, operations 500 may be performed by one or more components of the cryptographic agility system described above with respect to FIGS. 1-4.

Operations 500 begin at step 502, with establishing, by a first endpoint of a plurality of endpoints related to a multi-endpoint secure communication session, a metadata channel with one or more other endpoints of the plurality of endpoints.

In some embodiments, the plurality of endpoints comprises cryptographic provider components of a cryptographic agility system that dynamically selects cryptographic techniques based on attributes related to requests for cryptographic operations.

Operations 500 continue at step 504, with sending, by the first endpoint, to a second endpoint of the one or more other endpoints, via the metadata channel, an indication of a cryptographic requirement related to the multi-endpoint secure communication session.

Some embodiments further comprise determining, by the first endpoint, the cryptographic requirement based on a secure negotiation among the plurality of endpoints related to the multi-endpoint secure communication session.

In some embodiments, the multi-endpoint secure communication session is associated with a unique identifier, and the first endpoint sends the indication of the cryptographic requirement in association with the unique identifier.

In certain embodiments, the first endpoints encrypts the indication of the cryptographic requirement using a public key associated with the second endpoint, and the sending of the indication of the cryptographic requirement comprises sending the encrypted indication of the cryptographic requirement.

Operations 500 continue at step 506, with performing, by the second endpoint, one or more cryptographic operations related to the multi-endpoint secure communication session based on the indication of the cryptographic requirement.

Operations 500 continue at step 508, with attesting, by the second endpoint, via the metadata channel, that the one or more cryptographic operations comply with the cryptographic requirement. The attesting may involve sending an attestation in association with the unique identifier.

In some embodiments, an entry is added to a secure digital ledger based on the attesting, by the second endpoint, via the metadata channel, that the one or more cryptographic operations comply with the cryptographic requirement, and wherein the entry comprises the unique identifier.

Certain embodiments further comprise determining, by the second endpoint, that a separate component performed a cryptographic operation related to the multi-endpoint secure communication session in accordance with the cryptographic requirement, and attesting, by the second endpoint, via the metadata channel, that the cryptographic operation performed by the separate component complies with the cryptographic requirement.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of multi-endpoint cryptographic orchestration, comprising:
    establishing, by a first endpoint of a plurality of endpoints related to a multi-endpoint secure communication session, a metadata channel with one or more other endpoints of the plurality of endpoints;
    sending, by the first endpoint, to a second endpoint of the one or more other endpoints, via the metadata channel, an indication of a cryptographic requirement related to the multi-endpoint secure communication session;
    performing, by the second endpoint, one or more cryptographic operations related to the multi-endpoint secure communication session based on the indication of the cryptographic requirement; and
    attesting, by the second endpoint, via the metadata channel, that the one or more cryptographic operations comply with the cryptographic requirement.

2. The method of claim 1, wherein the multi-endpoint secure communication session is associated with a unique identifier, and wherein the first endpoint sends the indication of the cryptographic requirement in association with the unique identifier.

3. The method of claim 2, wherein an entry is added to a secure digital ledger based on the attesting, by the second endpoint, via the metadata channel, that the one or more cryptographic operations comply with the cryptographic requirement, and wherein the entry comprises the unique identifier.

4. The method of claim 1, wherein the first endpoint encrypts the indication of the cryptographic requirement using a public key associated with the second endpoint, and wherein the sending of the indication of the cryptographic requirement comprises sending the encrypted indication of the cryptographic requirement.

5. The method of claim 1, further comprising determining, by the first endpoint, the cryptographic requirement based on a secure negotiation among the plurality of endpoints related to the multi-endpoint secure communication session.

6. The method of claim 1, wherein the plurality of endpoints comprises cryptographic provider components of a cryptographic agility system that dynamically selects cryptographic techniques based on attributes related to requests for cryptographic operations.

7. The method of claim 1, further comprising:
    determining, by the second endpoint, that a separate component performed a cryptographic operation related to the multi-endpoint secure communication session in accordance with the cryptographic requirement; and
    attesting, by the second endpoint, via the metadata channel, that the cryptographic operation performed by the separate component complies with the cryptographic requirement.

8. A system for multi-endpoint cryptographic orchestration, comprising:
    at least one memory; and
    at least one processor coupled to the at least one memory, the at least one processor and the at least one memory configured to:
        establish, by a first endpoint of a plurality of endpoints related to a multi-endpoint secure communication session, a metadata channel with one or more other endpoints of the plurality of endpoints;
        send, by the first endpoint, to a second endpoint of the one or more other endpoints, via the metadata channel, an indication of a cryptographic requirement related to the multi-endpoint secure communication session;
        perform, by the second endpoint, one or more cryptographic operations related to the multi-endpoint secure communication session based on the indication of the cryptographic requirement; and
        attest, by the second endpoint, via the metadata channel, that the one or more cryptographic operations comply with the cryptographic requirement.

9. The system of claim 8, wherein the multi-endpoint secure communication session is associated with a unique identifier, and wherein the first endpoint sends the indication of the cryptographic requirement in association with the unique identifier.

10. The system of claim 9, wherein an entry is added to a secure digital ledger based on the attesting, by the second endpoint, via the metadata channel, that the one or more cryptographic operations comply with the cryptographic requirement, and wherein the entry comprises the unique identifier.

11. The system of claim 8, wherein the first endpoint encrypts the indication of the cryptographic requirement using a public key associated with the second endpoint, and wherein the sending of the indication of the cryptographic requirement comprises sending the encrypted indication of the cryptographic requirement.

12. The system of claim 8, wherein the at least one processor and the at least one memory are further configured to determine, by the first endpoint, the cryptographic requirement based on a secure negotiation among the plurality of endpoints related to the multi-endpoint secure communication session.

13. The system of claim 8, wherein the plurality of endpoints comprises cryptographic provider components of a cryptographic agility system that dynamically selects cryptographic techniques based on attributes related to requests for cryptographic operations.

14. The system of claim 8, wherein the at least one processor and the at least one memory are further configured to:
    determine, by the second endpoint, that a separate component performed a cryptographic operation related to the multi-endpoint secure communication session in accordance with the cryptographic requirement; and
    attest, by the second endpoint, via the metadata channel, that the cryptographic operation performed by the separate component complies with the cryptographic requirement.

15. A non-transitory computer readable medium storing instructions that, when executed by one or more processors, cause the one or more processors to:
    establish, by a first endpoint of a plurality of endpoints related to a multi-endpoint secure communication session, a metadata channel with one or more other endpoints of the plurality of endpoints;
    send, by the first endpoint, to a second endpoint of the one or more other endpoints, via the metadata channel, an indication of a cryptographic requirement related to the multi-endpoint secure communication session;
    perform, by the second endpoint, one or more cryptographic operations related to the multi-endpoint secure communication session based on the indication of the cryptographic requirement; and
    attest, by the second endpoint, via the metadata channel, that the one or more cryptographic operations comply with the cryptographic requirement.

16. The non-transitory computer readable medium of claim 15, wherein the multi-endpoint secure communication session is associated with a unique identifier, and wherein the first endpoint sends the indication of the cryptographic requirement in association with the unique identifier.

17. The non-transitory computer readable medium of claim 16, wherein an entry is added to a secure digital ledger based on the attesting, by the second endpoint, via the metadata channel, that the one or more cryptographic operations comply with the cryptographic requirement, and wherein the entry comprises the unique identifier.

18. The non-transitory computer readable medium of claim 15, wherein the first endpoint encrypts the indication of the cryptographic requirement using a public key associated with the second endpoint, and wherein the sending of the indication of the cryptographic requirement comprises sending the encrypted indication of the cryptographic requirement.

19. The non-transitory computer readable medium of claim 15, wherein the instructions, when executed by the one or more processors, cause the one or more processors to determine, by the first endpoint, the cryptographic requirement based on a secure negotiation among the plurality of endpoints related to the multi-endpoint secure communication session.

20. The non-transitory computer readable medium of claim 15, wherein the plurality of endpoints comprises cryptographic provider components of a cryptographic agility system that dynamically selects cryptographic techniques based on attributes related to requests for cryptographic operations.

* * * * *